US008972612B2

(12) United States Patent
Le et al.

(10) Patent No.: US 8,972,612 B2
(45) Date of Patent: Mar. 3, 2015

(54) COLLECTING ASYMMETRIC DATA AND PROXY DATA ON A COMMUNICATION NETWORK

(75) Inventors: Robert Le, Milpitas, CA (US); Cemal Dikmen, Trumbull, CT (US); Bulent Erbilgin, Cupertino, CA (US); Timothy Bean, Pleasanton, CA (US)

(73) Assignee: SSB Networks, Inc., Milpitas, CA (US)

( * ) Notice: Subject to any disclaimer, the term of this patent is extended or adjusted under 35 U.S.C. 154(b) by 60 days.

(21) Appl. No.: 13/440,877

(22) Filed: Apr. 5, 2012

(65) Prior Publication Data

US 2013/0097308 A1    Apr. 18, 2013

Related U.S. Application Data

(60) Provisional application No. 61/472,189, filed on Apr. 5, 2011.

(51) Int. Cl.
*G06F 15/16* (2006.01)
*G06F 15/173* (2006.01)
*H04L 29/08* (2006.01)
*H04L 12/26* (2006.01)

(52) U.S. Cl.
CPC ............ *H04L 67/22* (2013.01); *H04L 43/028* (2013.01); *H04L 43/12* (2013.01)
USPC .......................................... 709/251; 709/223

(58) Field of Classification Search
USPC ........................................................ 709/251
See application file for complete search history.

(56) References Cited

U.S. PATENT DOCUMENTS

| | | | |
|---|---|---|---|
| 5,185,860 A | 2/1993 | Wu |
| 5,444,850 A | 8/1995 | Chang |
| 5,475,819 A | 12/1995 | Miller et al. |
| 5,675,741 A | 10/1997 | Aggarwal et al. |
| 5,796,952 A | 8/1998 | Davis et al. |
| 5,835,580 A | 11/1998 | Fraser |
| 5,835,720 A | 11/1998 | Nelson et al. |
| 5,862,223 A | 1/1999 | Walker et al. |
| 5,878,384 A | 3/1999 | Johnson et al. |

(Continued)

OTHER PUBLICATIONS

"Visualizing criminal relationships: comparison of a hyperbolic tree and a hierarchical list", By Yang Xiang et al., Jul. 14, 2005 (pp. 15) http://ai.arizona.edu/intranet/papers/VisualizingCriminalRelationships.pdf.

(Continued)

*Primary Examiner* — Emmanuel L Moise
*Assistant Examiner* — Mahran Abu Roumi
(74) *Attorney, Agent, or Firm* — Raj Abhyanker, P.C.

(57) ABSTRACT

A system, method, and apparatus for collecting data streams, such as data packets, on a network, such as the Internet, are disclosed. A metadata portion of at least one of the data streams is analyzed on the network and evaluated using a metadata processing engine to identify a relationship between at least two of the plurality of data streams, e.g., a relationship between multiple users of interest, a new user of interest, etc. Evaluation of the metadata and the relationships can be performed algorithmically, as predetermined by an analyst or as provided as preset options by the network monitoring system (NMS). An interface manager can receive the new user of interest, evaluate the new user of interest for redundancy against existing users of interest of the NMS; then communicate the new user of interest to at least one access device to collect data streams associated with the new user of interest.

23 Claims, 18 Drawing Sheets

(56) References Cited

U.S. PATENT DOCUMENTS

| | | |
|---|---|---|
| 5,894,311 A | 4/1999 | Jackson |
| 5,944,790 A | 8/1999 | Levy |
| 5,954,797 A | 9/1999 | Sidey |
| 5,958,010 A | 9/1999 | Agarwal et al. |
| 5,987,430 A | 11/1999 | Van Horne et al. |
| 5,996,011 A | 11/1999 | Humes |
| 6,006,260 A | 12/1999 | Barrick, Jr. et al. |
| 6,012,088 A | 1/2000 | Li et al. |
| 6,055,542 A | 4/2000 | Nielsen et al. |
| 6,055,573 A | 4/2000 | Gardenswartz et al. |
| 6,078,956 A | 6/2000 | Bryant et al. |
| 6,112,240 A | 8/2000 | Pogue et al. |
| 6,115,742 A | 9/2000 | Franklin et al. |
| 6,119,164 A | 9/2000 | Basche |
| 6,134,592 A | 10/2000 | Montulli |
| 6,148,342 A | 11/2000 | Ho |
| 6,151,631 A | 11/2000 | Ansell et al. |
| 6,182,075 B1 | 1/2001 | Hsu |
| 6,289,341 B1 | 9/2001 | Barney |
| 6,314,460 B1 | 11/2001 | Knight et al. |
| 6,317,792 B1 | 11/2001 | Mundy et al. |
| 6,321,256 B1 | 11/2001 | Himmel et al. |
| 6,321,336 B1 | 11/2001 | Applegate et al. |
| 6,321,338 B1 | 11/2001 | Porras et al. |
| 6,327,619 B1 | 12/2001 | Blumenau |
| 6,359,557 B2 | 3/2002 | Bilder |
| 6,373,838 B1 | 4/2002 | Law et al. |
| 6,377,987 B1 | 4/2002 | Kracht |
| 6,385,024 B1 | 5/2002 | Olson |
| 6,393,460 B1 | 5/2002 | Gruen et al. |
| 6,393,461 B1 | 5/2002 | Okada et al. |
| 6,393,479 B1 | 5/2002 | Glommen et al. |
| 6,404,860 B1 | 6/2002 | Casellini |
| 6,425,007 B1 | 7/2002 | Messinger |
| 6,442,590 B1 | 8/2002 | Inala et al. |
| 6,449,604 B1 | 9/2002 | Hansen et al. |
| 6,466,981 B1 | 10/2002 | Levy |
| 6,466,984 B1 | 10/2002 | Naveh et al. |
| 6,470,386 B1 | 10/2002 | Combar et al. |
| 6,487,538 B1 | 11/2002 | Gupta et al. |
| 6,507,869 B1 | 1/2003 | Franke et al. |
| 6,516,345 B1 | 2/2003 | Kracht |
| 6,564,261 B1 | 5/2003 | Gudjonsson et al. |
| 6,591,251 B1 | 7/2003 | Leon et al. |
| 6,606,657 B1 | 8/2003 | Zilberstein et al. |
| 6,658,465 B1 | 12/2003 | Touboul |
| 6,665,715 B1 | 12/2003 | Houri |
| 6,678,720 B1 | 1/2004 | Matsumoto et al. |
| 6,714,977 B1 | 3/2004 | Fowler et al. |
| 6,721,726 B1 | 4/2004 | Swaminathan et al. |
| 6,725,377 B1 | 4/2004 | Kouznetsov |
| 6,760,761 B1 | 7/2004 | Sciacca |
| 6,782,421 B1 | 8/2004 | Soles et al. |
| 6,792,458 B1 | 9/2004 | Muret et al. |
| 6,795,856 B1 | 9/2004 | Bunch |
| 6,804,701 B2 | 10/2004 | Muret et al. |
| 6,892,226 B1 | 5/2005 | Tso et al. |
| 6,925,454 B2 | 8/2005 | Lam et al. |
| 6,941,321 B2 | 9/2005 | Schuetze et al. |
| 6,957,229 B1 | 10/2005 | Dyor |
| 6,973,577 B1 | 12/2005 | Kouznetsov |
| 6,981,047 B2 | 12/2005 | Hanson et al. |
| 6,983,317 B1 | 1/2006 | Bishop et al. |
| 6,985,901 B1 | 1/2006 | Sachse et al. |
| 7,006,508 B2 | 2/2006 | Bondy et al. |
| 7,027,398 B2 | 4/2006 | Fang |
| 7,027,416 B1 | 4/2006 | Kriz |
| 7,031,941 B2 | 4/2006 | Garrow et al. |
| 7,039,699 B1 | 5/2006 | Narin et al. |
| 7,046,247 B2 | 5/2006 | Hao et al. |
| 7,047,294 B2 | 5/2006 | Johnson et al. |
| 7,050,396 B1 | 5/2006 | Cohen et al. |
| 7,055,174 B1 | 5/2006 | Cope et al. |
| 7,058,704 B1 | 6/2006 | Mangipudi et al. |
| 7,058,976 B1 | 6/2006 | Dark |
| 7,076,275 B1 | 7/2006 | Karstens et al. |
| 7,083,095 B2 | 8/2006 | Hendrick |
| 7,093,020 B1 | 8/2006 | McCarty et al. |
| 7,143,151 B1 | 11/2006 | Kayashima et al. |
| 7,152,103 B1 | 12/2006 | Ryan et al. |
| 7,152,108 B1 | 12/2006 | Khan et al. |
| 7,152,242 B2 | 12/2006 | Douglas |
| 7,171,681 B1 | 1/2007 | Duncan et al. |
| 7,203,674 B2 | 4/2007 | Cohen |
| 7,206,835 B2 | 4/2007 | Kusumoto et al. |
| 7,212,491 B2 | 5/2007 | Koga |
| 7,216,110 B1 | 5/2007 | Ogg et al. |
| 7,228,566 B2 | 6/2007 | Caceres et al. |
| 7,231,448 B1 | 6/2007 | O'Steen et al. |
| 7,246,162 B2 | 7/2007 | Tindal |
| 7,257,722 B2 | 8/2007 | Sone |
| 7,277,938 B2 | 10/2007 | Duimovich et al. |
| 7,277,941 B2 | 10/2007 | Ignatius et al. |
| 7,278,037 B2 | 10/2007 | Sone |
| 7,313,625 B2 | 12/2007 | Tindal et al. |
| 7,328,242 B1 | 2/2008 | McCarthy et al. |
| 7,346,658 B2 | 3/2008 | Simpson |
| 7,356,576 B2 | 4/2008 | Rabe |
| 7,359,967 B1 | 4/2008 | Synnestvedt et al. |
| 7,373,399 B2 | 5/2008 | Steele et al. |
| 7,376,722 B1 | 5/2008 | Sim et al. |
| 7,386,613 B2 | 6/2008 | Piccirilli et al. |
| 7,386,883 B2 | 6/2008 | Bardsley et al. |
| 7,406,516 B2 | 7/2008 | Davis et al. |
| 7,437,444 B2 | 10/2008 | Houri |
| 7,437,761 B2 | 10/2008 | Takahashi |
| 7,447,909 B2 | 11/2008 | Reith |
| 7,466,690 B2 | 12/2008 | Schrodi |
| 7,472,412 B2 | 12/2008 | Wolf et al. |
| 7,474,617 B2 | 1/2009 | Molen et al. |
| 7,478,161 B2 | 1/2009 | Bernet et al. |
| 7,490,065 B1 | 2/2009 | Ogg et al. |
| 7,496,049 B2 | 2/2009 | Estrada et al. |
| 7,506,072 B2 | 3/2009 | Waldorf et al. |
| 7,523,191 B1 | 4/2009 | Thomas et al. |
| 7,526,541 B2 | 4/2009 | Roese et al. |
| 7,535,993 B2 | 5/2009 | Cai et al. |
| 7,536,459 B2 | 5/2009 | Johnson et al. |
| 7,570,743 B2 | 8/2009 | Barclay et al. |
| 7,571,237 B2 | 8/2009 | Pfitzmann |
| 7,580,356 B1 | 8/2009 | Mishra et al. |
| 7,587,453 B2 | 9/2009 | Bhrara et al. |
| 7,587,757 B2 | 9/2009 | Scoggins et al. |
| 7,617,160 B1 | 11/2009 | Grove et al. |
| 7,624,144 B1 | 11/2009 | Mitrov |
| 7,627,664 B2 | 12/2009 | Sutou et al. |
| 7,631,007 B2 | 12/2009 | Morris |
| 7,636,680 B2 | 12/2009 | Gatto |
| 7,639,613 B1 | 12/2009 | Ghannadian et al. |
| 7,647,406 B2 | 1/2010 | Liu |
| 7,657,540 B1 | 2/2010 | Bayliss |
| 7,664,974 B2 | 2/2010 | Sone |
| 7,676,570 B2 | 3/2010 | Levy et al. |
| 7,698,457 B2 | 4/2010 | Ghetie et al. |
| 7,730,120 B2 | 6/2010 | Singh et al. |
| 7,747,737 B1 | 6/2010 | Apte et al. |
| 7,769,851 B1 | 8/2010 | Guruswamy et al. |
| 7,779,073 B2 | 8/2010 | Hoile et al. |
| 7,809,826 B1 | 10/2010 | Guruswamy |
| 7,835,406 B2 | 11/2010 | Oran et al. |
| 7,852,849 B2 | 12/2010 | Davidson et al. |
| 7,873,719 B2 | 1/2011 | Bishop et al. |
| 7,885,194 B1 | 2/2011 | Narin et al. |
| 7,886,049 B2 | 2/2011 | Adelstein et al. |
| 7,904,478 B2 | 3/2011 | Yu et al. |
| 7,904,554 B1 | 3/2011 | Lu et al. |
| 7,933,926 B2 | 4/2011 | Ebert |
| 7,941,507 B1 | 5/2011 | Murphy, Jr. et al. |
| 7,953,851 B2 | 5/2011 | Britton et al. |
| 7,958,233 B2 | 6/2011 | Fernández Gutierrez |
| 7,958,267 B1 | 6/2011 | Eiras et al. |
| 7,975,046 B2 | 7/2011 | Sheppard |
| 7,979,521 B2 | 7/2011 | Greaves et al. |
| 7,979,529 B2 | 7/2011 | Kreusch et al. |

(56) References Cited

U.S. PATENT DOCUMENTS

| | | |
|---|---|---|
| 7,984,138 B2 | 7/2011 | Bantz et al. |
| 7,996,493 B2 | 8/2011 | Hill |
| 8,001,246 B2 | 8/2011 | Lu et al. |
| 8,010,085 B2 | 8/2011 | Apte et al. |
| 8,010,602 B2 | 8/2011 | Shen et al. |
| 8,010,689 B2 | 8/2011 | Deninger et al. |
| 8,014,303 B2 | 9/2011 | Narin et al. |
| 8,015,277 B2 | 9/2011 | Brown et al. |
| 8,032,701 B1 | 10/2011 | Glade et al. |
| 8,041,022 B1 | 10/2011 | Andreasen et al. |
| 8,051,130 B2 | 11/2011 | Logan et al. |
| 8,051,168 B1 | 11/2011 | Boysko et al. |
| 8,055,709 B2 | 11/2011 | Singh et al. |
| 8,059,790 B1 | 11/2011 | Paterik et al. |
| 8,065,247 B2 | 11/2011 | Schlottmann |
| 8,077,704 B2 | 12/2011 | Yin et al. |
| 8,078,679 B2 | 12/2011 | Kajekar et al. |
| 8,090,852 B2 | 1/2012 | Ianchici et al. |
| 8,099,500 B2 | 1/2012 | Deason |
| 8,117,314 B2 | 2/2012 | Croft et al. |
| 8,127,005 B2 | 2/2012 | Fernández Gutierrez |
| 8,135,134 B2 | 3/2012 | Orsini et al. |
| 8,135,833 B2 | 3/2012 | Cancel et al. |
| 8,140,319 B2 | 3/2012 | Wasser |
| 8,145,753 B2 | 3/2012 | Inoue et al. |
| 8,156,155 B1 | 4/2012 | Yu et al. |
| 8,200,809 B2 | 6/2012 | Sheppard |
| 8,204,884 B2 | 6/2012 | Freedman et al. |
| 8,230,056 B2 | 7/2012 | Bishop et al. |
| 8,234,368 B1 | 7/2012 | Nielsen et al. |
| 8,244,859 B2 | 8/2012 | Ramakrishnan et al. |
| 8,281,027 B2 | 10/2012 | Martinez et al. |
| 8,281,175 B2 | 10/2012 | Blackburn et al. |
| 8,281,360 B2 | 10/2012 | Flewallen et al. |
| 8,316,134 B2 | 11/2012 | Tanimoto |
| 8,321,515 B1 | 11/2012 | Gailloux et al. |
| 8,327,012 B1 | 12/2012 | Nguyen et al. |
| 8,332,477 B1 | 12/2012 | Kaiserlian et al. |
| 8,332,507 B2 | 12/2012 | Wagh et al. |
| 8,352,590 B2 | 1/2013 | Sankaran et al. |
| 8,375,118 B2 | 2/2013 | Hao et al. |
| 8,380,234 B2 | 2/2013 | Kronander et al. |
| 8,380,863 B2 | 2/2013 | Natarajan et al. |
| 8,396,075 B2 | 3/2013 | Skoczkowski et al. |
| 8,407,038 B2 | 3/2013 | Bizzarri et al. |
| 8,407,340 B2 | 3/2013 | Zamora Cura |
| 8,416,695 B2 | 4/2013 | Liu et al. |
| 8,438,089 B1 | 5/2013 | Wasserblat et al. |
| 8,443,041 B1 | 5/2013 | Krantz et al. |
| 8,462,160 B2 | 6/2013 | Lindsay et al. |
| 8,468,241 B1 | 6/2013 | Raizen et al. |
| 8,468,244 B2 | 6/2013 | Redlich et al. |
| 8,478,879 B2 | 7/2013 | Brown et al. |
| 8,479,212 B2 | 7/2013 | Jamjoom et al. |
| 8,527,577 B2 | 9/2013 | Lu et al. |
| 8,542,592 B2 | 9/2013 | Moisand et al. |
| 8,542,676 B2 | 9/2013 | Lakhani et al. |
| 8,544,023 B2 | 9/2013 | Sim-Tang et al. |
| 8,572,252 B2 | 10/2013 | Ahuja et al. |
| 8,589,516 B2 | 11/2013 | Wheeler et al. |
| 8,595,490 B2 | 11/2013 | Von Mueller et al. |
| 8,599,747 B1 | 12/2013 | Saleem et al. |
| 8,620,353 B1 | 12/2013 | Kahn et al. |
| 8,621,090 B2 | 12/2013 | Bustamente |
| 8,626,860 B1 | 1/2014 | Gailloux et al. |
| 8,626,901 B2 | 1/2014 | Pugh et al. |
| 8,627,479 B2 | 1/2014 | Wittenstein et al. |
| 8,630,836 B2 | 1/2014 | Wasser |
| 8,630,854 B2 | 1/2014 | Marvit |
| 8,634,423 B1 | 1/2014 | Olding et al. |
| 8,645,453 B2 | 2/2014 | Cheng et al. |
| 8,655,939 B2 | 2/2014 | Redlich et al. |
| 8,661,125 B2 | 2/2014 | Avner et al. |
| 8,698,872 B2 | 4/2014 | Begeja et al. |
| 8,712,019 B2 | 4/2014 | Anchan et al. |
| 8,713,453 B2 | 4/2014 | Shahine et al. |
| 8,719,896 B2 | 5/2014 | Poulsen et al. |
| 8,725,869 B1 | 5/2014 | Reiner et al. |
| 8,756,312 B2 | 6/2014 | Malloy et al. |
| 8,769,059 B1 | 7/2014 | Chheda et al. |
| 8,782,283 B2 | 7/2014 | Attanasio |
| 8,793,395 B2 | 7/2014 | Cadiou et al. |
| 8,810,577 B2 | 8/2014 | De Pauw et al. |
| 8,812,740 B2 | 8/2014 | Li et al. |
| 8,813,090 B2 | 8/2014 | Jamjoom et al. |
| 2001/0052081 A1 | 12/2001 | McKibben et al. |
| 2002/0026505 A1 | 2/2002 | Terry |
| 2002/0042821 A1* | 4/2002 | Muret et al. ............... 709/223 |
| 2002/0078382 A1 | 6/2002 | Sheikh et al. |
| 2002/0099818 A1 | 7/2002 | Russell et al. |
| 2002/0174235 A1 | 11/2002 | Likourezos |
| 2003/0023715 A1 | 1/2003 | Reiner et al. |
| 2003/0043820 A1 | 3/2003 | Goringe et al. |
| 2003/0059017 A1 | 3/2003 | Cugalj et al. |
| 2003/0065605 A1 | 4/2003 | Gatto |
| 2003/0074369 A1 | 4/2003 | Schuetze et al. |
| 2003/0120822 A1* | 6/2003 | Langrind et al. ............ 709/251 |
| 2003/0140131 A1 | 7/2003 | Chandrashekhar et al. |
| 2003/0214504 A1 | 11/2003 | Hao et al. |
| 2004/0022191 A1 | 2/2004 | Bernet et al. |
| 2004/0049693 A1 | 3/2004 | Douglas |
| 2004/0105424 A1 | 6/2004 | Skoczkowski et al. |
| 2004/0181599 A1 | 9/2004 | Kreusch et al. |
| 2004/0199623 A1 | 10/2004 | Houri |
| 2004/0202295 A1 | 10/2004 | Shen et al. |
| 2004/0215770 A1 | 10/2004 | Maher, III et al. |
| 2004/0243704 A1 | 12/2004 | Botelho et al. |
| 2004/0249938 A1 | 12/2004 | Bunch |
| 2004/0255126 A1 | 12/2004 | Reith |
| 2004/0267729 A1 | 12/2004 | Swaminathan et al. |
| 2005/0013259 A1 | 1/2005 | Papoushado et al. |
| 2005/0060102 A1 | 3/2005 | O'Reilly et al. |
| 2005/0076117 A1 | 4/2005 | Hou et al. |
| 2005/0174937 A1 | 8/2005 | Scoggins et al. |
| 2005/0210409 A1 | 9/2005 | Jou |
| 2005/0246419 A1 | 11/2005 | Jaatinen |
| 2006/0015613 A1 | 1/2006 | Greaves |
| 2006/0026268 A1 | 2/2006 | Sanda |
| 2006/0041660 A1 | 2/2006 | Bishop et al. |
| 2006/0064391 A1 | 3/2006 | Petrov et al. |
| 2006/0168332 A1 | 7/2006 | Pfitzmann |
| 2006/0230037 A1 | 10/2006 | Sugiyama et al. |
| 2007/0005713 A1 | 1/2007 | LeVasseur et al. |
| 2007/0055766 A1 | 3/2007 | Petropoulakis et al. |
| 2007/0118640 A1 | 5/2007 | Subramanian et al. |
| 2007/0156889 A1 | 7/2007 | Bhrara et al. |
| 2007/0203991 A1 | 8/2007 | Fisher et al. |
| 2007/0266145 A1 | 11/2007 | Nesbitt et al. |
| 2007/0299964 A1 | 12/2007 | Wong et al. |
| 2008/0028031 A1 | 1/2008 | Bailey et al. |
| 2008/0036767 A1 | 2/2008 | Janzen |
| 2008/0052392 A1 | 2/2008 | Webster et al. |
| 2008/0147623 A1* | 6/2008 | Swaminathan et al. ......... 707/3 |
| 2008/0162397 A1 | 7/2008 | Zaltzman |
| 2008/0183867 A1 | 7/2008 | Singh et al. |
| 2009/0077623 A1 | 3/2009 | Baum et al. |
| 2009/0132450 A1 | 5/2009 | Schlottmann |
| 2009/0150472 A1 | 6/2009 | Devarakonda et al. |
| 2009/0164629 A1 | 6/2009 | Klein et al. |
| 2009/0165142 A1 | 6/2009 | Adelstein et al. |
| 2009/0171960 A1 | 7/2009 | Katzir |
| 2009/0193037 A1 | 7/2009 | Yu et al. |
| 2009/0254572 A1* | 10/2009 | Redlich et al. ............... 707/10 |
| 2009/0254653 A1 | 10/2009 | Kowa et al. |
| 2010/0042545 A1 | 2/2010 | Ogg et al. |
| 2010/0057858 A1 | 3/2010 | Shen et al. |
| 2010/0071053 A1 | 3/2010 | Ansari et al. |
| 2010/0079464 A1 | 4/2010 | Matsumura |
| 2010/0086119 A1 | 4/2010 | De Luca et al. |
| 2010/0094910 A1 | 4/2010 | Bayliss |
| 2010/0095017 A1 | 4/2010 | Ghetie et al. |
| 2010/0115018 A1 | 5/2010 | Yoon et al. |
| 2010/0150138 A1 | 6/2010 | Bjorsell et al. |
| 2010/0169234 A1 | 7/2010 | Metzger et al. |

(56) References Cited

U.S. PATENT DOCUMENTS

| | | |
|---|---|---|
| 2010/0169479 A1 | 7/2010 | Jeong et al. |
| 2010/0182320 A1 | 7/2010 | Cartan |
| 2010/0199189 A1 | 8/2010 | Ben-Aroya et al. |
| 2010/0211672 A1 | 8/2010 | Brown et al. |
| 2010/0217837 A1 | 8/2010 | Ansari et al. |
| 2010/0228854 A1 | 9/2010 | Morrison et al. |
| 2010/0250497 A1 | 9/2010 | Redlich et al. |
| 2010/0281161 A1 | 11/2010 | Cohn et al. |
| 2010/0287286 A1 | 11/2010 | Bustamente |
| 2010/0309786 A1 | 12/2010 | Moisand et al. |
| 2010/0312884 A1 | 12/2010 | Nandy et al. |
| 2010/0312903 A1 | 12/2010 | Miyata |
| 2010/0318647 A1 | 12/2010 | Savoor et al. |
| 2010/0321183 A1 | 12/2010 | Donovan et al. |
| 2010/0333116 A1 | 12/2010 | Prahlad et al. |
| 2011/0010449 A1 | 1/2011 | Andrews et al. |
| 2011/0029667 A1 | 2/2011 | Imbimbo et al. |
| 2011/0030067 A1 | 2/2011 | Wilson |
| 2011/0047273 A1 | 2/2011 | Young, Jr. et al. |
| 2011/0161507 A1 | 6/2011 | O'Sullivan et al. |
| 2011/0173330 A1 | 7/2011 | Gong et al. |
| 2011/0182205 A1 | 7/2011 | Gerdes et al. |
| 2011/0206198 A1 | 8/2011 | Freedman et al. |
| 2011/0208859 A1 | 8/2011 | Fernández Gutierrez |
| 2011/0214187 A1 | 9/2011 | Wittenstein et al. |
| 2011/0252032 A1 | 10/2011 | Fitzgerald et al. |
| 2011/0252138 A1 | 10/2011 | Ahuja et al. |
| 2011/0270977 A1 | 11/2011 | Ansiaux et al. |
| 2011/0282981 A1 | 11/2011 | Cutler et al. |
| 2011/0283343 A1 | 11/2011 | Jaeger et al. |
| 2011/0289134 A1 | 11/2011 | De Los Reyes et al. |
| 2011/0296014 A1 | 12/2011 | Cancel et al. |
| 2012/0005331 A1 | 1/2012 | Beattie, Jr. et al. |
| 2012/0016715 A1 | 1/2012 | Brown et al. |
| 2012/0030729 A1 | 2/2012 | Schwartz et al. |
| 2012/0078708 A1 | 3/2012 | Taylor et al. |
| 2012/0084081 A1 | 4/2012 | Melamed et al. |
| 2012/0084288 A1 | 4/2012 | Abdul-Razzak et al. |
| 2012/0096145 A1 | 4/2012 | Le et al. |
| 2012/0110062 A1 | 5/2012 | Savage et al. |
| 2012/0117236 A1 | 5/2012 | Fukuda et al. |
| 2012/0131474 A1 | 5/2012 | Panchadsaram et al. |
| 2012/0143972 A1 | 6/2012 | Malik et al. |
| 2012/0143973 A1 | 6/2012 | Niewerth |
| 2012/0150955 A1 | 6/2012 | Tseng |
| 2012/0158955 A1 | 6/2012 | Kim et al. |
| 2012/0191854 A1 | 7/2012 | Bharatia et al. |
| 2012/0197976 A1 | 8/2012 | Welingkar et al. |
| 2012/0203847 A1 | 8/2012 | Kendall et al. |
| 2012/0210120 A1 | 8/2012 | Irvine |
| 2012/0210427 A1 | 8/2012 | Bronner et al. |
| 2012/0224021 A1 | 9/2012 | Begeja et al. |
| 2012/0239805 A1 | 9/2012 | Savoor et al. |
| 2012/0239809 A1 | 9/2012 | Mazumdar et al. |
| 2012/0254403 A1 | 10/2012 | Imbimbo et al. |
| 2012/0259975 A1 | 10/2012 | Le et al. |
| 2012/0265824 A1 | 10/2012 | Lawbaugh |
| 2012/0266081 A1 | 10/2012 | Kao |
| 2012/0317196 A1 | 12/2012 | Schigel et al. |
| 2012/0324470 A1 | 12/2012 | Jamjoom et al. |
| 2012/0331126 A1 | 12/2012 | Abdul-Razzak et al. |
| 2013/0007129 A1 | 1/2013 | German et al. |
| 2013/0024506 A1 | 1/2013 | Setton |
| 2013/0054749 A1 | 2/2013 | Yao et al. |
| 2013/0061049 A1 | 3/2013 | Irvine |
| 2013/0091241 A1 | 4/2013 | Goetz et al. |
| 2013/0145289 A1 | 6/2013 | Abdul-Razzak et al. |
| 2013/0155068 A1 | 6/2013 | Bier et al. |
| 2013/0159234 A1 | 6/2013 | Xing et al. |
| 2013/0162648 A1 | 6/2013 | Abdul-Razzak et al. |
| 2013/0191493 A1 | 7/2013 | Robert Le et al. |
| 2013/0207980 A1 | 8/2013 | Ankisettipalli et al. |
| 2013/0262622 A1 | 10/2013 | Li et al. |
| 2013/0268443 A1 | 10/2013 | Petrov et al. |
| 2013/0275306 A1 | 10/2013 | Ignatchenko et al. |
| 2013/0293551 A1 | 11/2013 | Erez et al. |
| 2013/0304761 A1 | 11/2013 | Redlich et al. |
| 2013/0311557 A1 | 11/2013 | Motes et al. |
| 2014/0032170 A1 | 1/2014 | De Pauw et al. |
| 2014/0059024 A1 | 2/2014 | Robert Le et al. |
| 2014/0082087 A1 | 3/2014 | Bustamente |
| 2014/0086102 A1 | 3/2014 | Doddapaneni |
| 2014/0149487 A1 | 5/2014 | Dikmen et al. |
| 2014/0150077 A1 | 5/2014 | Roy et al. |
| 2014/0222522 A1 | 8/2014 | Mitchell Barry Chait |

OTHER PUBLICATIONS

"Securing Public Instant Messaging (IM) At Work", By Nigel Williams, Joanne Ly, Jul. 2004 (pp. 43) http://caia.swin.edu.au/reports/040726A/CAIA-TR-040726A.pdf.

"Network Element Service Specification Template", By S. Shenker et al., Sep. 1997 (pp. 22) http://tools.ietf.org/pdf/rfc2216.pdf.

"RSVP+: An Extension to RSVP", By Silvano Gai et al., Jun. 1999 (pp. 18) http://tools.ietf.org/pdf/draft-sgai-rsvp-plus-00.pdf.

"Cellular access control and charging for mobile operator wireless local area networks", By H. Haverinen et al., Jan. 14, 2003 (p. 1) http://ieeexplore.ieee.org/xpl/articleDetails.jsp?tp=&arnumber=1160081&url=http%3A%2F%2Fieeexplore.ieee.org%2Fxpls%2Fabs all.jsp%3Farnumber%3D1160081.

"An Analysis of Anonymity in the Bitcoin System", By Reid Fergal et al., May 7, 2012 (pp. 30) http://arxiv.org/pdf/1107.4524.pdf?origin=publication_detail.

* cited by examiner

----- DATA ENTRY TO DATA MEDIATION ENGINE AND ACCESS ----- 700-A

| COL→ | A | B | C | D | E | F | G | H | J | K | L | M | N | N2 |
|---|---|---|---|---|---|---|---|---|---|---|---|---|---|---|
| ROW: | AUTH ID | JUDGE ID | TARGET (NON-TARGET) | TARGET TYPE | NW ID | 3RD PTY | START | DURATION | TIMES | NSS USER (LEA) | SPVSR | CONTACT ID | TARGET ID | RECORD ID |
| 701 | 1 | J1 | DEWEY DOE | EMAIL | NW1 | ANY | 10/1/2010 | 6 MO. | 12A-5A | L1 | S1 | C1 | 1 | 81 |
| 702 | 1 | J1 | (JOHN DOE) | CELL PH | NW2 | ANY | 10/1/2010 | 1 WK | 6A-6P | (L2) | S2 | C2 | (2) | 82 |
| ... | | | | | | | | | | | | | | |
| 703 | 1 | J4 | CHEE DOE | VOIP | NW2+3 | FAMILY | 10/4/2010 | 1 YEAR | | L3 | S3 | C2 | 3 | 83 |
| 704 | 2 | J2 | JOHN DOE | EFAX | NW1 | BUSINESS | 10/2/2010 | 3 WKS | 9P-3A | L3 | S4 | C3 | 4 | 84 |
| 705 | 2 | J2 | JOHN DOE | CELL PH | NW2 | ANY | 10/1/2010 | 1 WK | 6A-6P | L3 | S2 | C2 | 5 | 85 |
| 706 | 2 | J2 | TOM DOE | | NW6 | ANY | 10/6/2010 | 1 MO. | 1 YR | L2 | S6 | C5 | 6 | 86 |
| 707 | *** | | | | | | | | | | | | *** | |
| 708 | N | J3 | (JOHN DOE) | CELL PH | NW7+8 | SHADY JOE | 10/8/2010 | 1.5 WKS | ALL DAY | (L4) | S7 | ID6 | (8) | 88 |
| 709 | N | J3 | HAO DOE | PH/FAX | ALL NW | ANY | 1/1/2011 | 6 MO. | ALL DAY | X | N/A | C7 | 9 | 89 |
| 710 | N | J3 | CLYDE JONES | | NWn | ANY | 10/1/2010 | 3 WKS | MID-6AM | L3 | S4 | C8 | 10 | 90 |
| 711 | ... | ... | (MRS J.DOE) | CELL | N/A | N/A | 9/30/2010 | N/A | N/A | N/A | N/A | N/A | ZERO | 101 |
| 712 | ... | ... | (MRS J.DOE) | CELL | N/A | (JOHN DOE) | 10/9/2010 | N/A | N/A | N/A | N/A | N/A | ZERO | 102 |
| 713 | ... | ... | (MRS J.DOE) | --- | N/A | SHADY JOE | 10/2/2010 | N/A | N/A | N/A | N/A | N/A | ZERO | 103 |
| 714 | N | N/A | ALL TARGETS | ANY | ANY | ANY | CONTINUOUS | CONTINUOUS | CONTINUOUS | N/A | N/A | N/A | A/R | A/R |
| 715 | N | N/A | ALL NON-TARGETS | ANY | ANY | ANY | CONTINUOUS | CONTINUOUS | CONTINUOUS | N/A | N/A | N/A | ZERO | A/R |
| 716 | N | J2 | MARY SMITH | MAC ID | NW5 | ANY | 11/1/2010 | 6 MO | 30 DAY | L1 | S1 | C4 | 10 | 110 |

FIGURE 7A

| COL→ | N | N2 | D | T | U | V | W | Y | N | AA | BB | CC |
|---|---|---|---|---|---|---|---|---|---|---|---|---|
| | | | | ACCESS + MEDIATE | | | | CIRCULAR BUFFER | MME | | | 700-B |
| ROW: | TAR-GET ID | RECO-RD ID | TARGET TYPE | ACCESS PROBE ID (CONTENT) | ADVAN-CED TARGET | MME INPUT | COMM INTERCEPT | RECORDING | TARGET ID | REC/EVAL META | RELAT-IONSHIP? | AUTO-PRO-VISION |
| 701 | 1 | 81 | EMAIL | A1 | N/A | X | X | YES | 1 | X | N/A | N/A |
| 702 | 2 | 82 | CELL PH | A2 | N/A | X | X | YES-1 | 2 | X | YES | N/A |
| 703 | 3 | 83 | VOIP | A2, A3 | N/A | X | X | YES | 3 | X | N/A | N/A |
| 704 | 4 | 84 | FAX | A1 | N/A | X | X | YES | 4 | X | N/A | N/A |
| 705 | 5 | 85 | MAC ID | A2 | N/A | X | X | YES | 5 | X | N/A | N/A |
| 706 | 6 | 86 | CHAT | A6 | N/A | X | X | YES | 6 | X | N/A | N/A |
| 707 | *** | | | | | X | | | | | | |
| 708 | 8 | 88 | CELL PH | A7-A8 | N/A | X | X | YES | 8 | X | YES | N/A |
| 709 | 9 | 89 | VOIP | A1-A8 | N/A | X | X | YES | 9 | X | N/A | N/A |
| 710 | 10 | 90 | TEXT | An | N/A | X | X | YES | 10 | X | N/A | N/A |
| 711 | ZERO | 101 | CELL PH | --- | YES | X | --- | YES-1 | ZERO | X | YES | N/A |
| 712 | ZERO | 102 | SMS | --- | N/A | X | --- | YES | ZERO | X | N/A | N/A |
| 713 | ZERO | 103 | VOIP | --- | YES | X | X | YES-1 | ZERO | X | YES | YES |
| 714 | A/R | A/R | ANY | ALL | N/A | X | X | YES | A/R | X | N/A | N/A |
| 715 | ZERO | A/R | ANY | ALL | N/A | X | X | YES | ZERO | X | N/A | N/A |
| 716 | 10 | 110 | VIDEO-CONF | A5 | N/A | X | X | YES | 10 | X | N/A | N/A |

| COL → | N | N2 | DD | EE | FF | GG |
|---|---|---|---|---|---|---|
| ROW: | TARGET ID | RECORD ID | MEM (FTP) | CONTENT | METADATA | DOSSIER |
| | | | ←—— COLLECTION - GUI OUTPUT ——→ | | | |
| 701 | 1 | 81 | ... | x | x | x |
| 702 | (2) | 82 | M1+M2 | x | x | x |
| 703 | 3 | 83 | * | x | x | x |
| 704 | 4 | 84 | * | x | x | x |
| 705 | 5 | 85 | M1+M2 | x | x | x |
| 706 | 6 | 86 | * | x | x | x |
| 707 | *** | | * | | | |
| 708 | (8) | 88 | M2+M3 | x | x | x |
| 709 | 9 | 89 | * | x | x | x |
| 710 | 10 | 90 | * | x | x | x |
| 711 | ZERO | 101 | N/A | N/A | x | x |
| 712 | ZERO | 102 | N/A | N/A | x | x |
| 713 | ZERO | 103 | N/A | N/A | x | x |
| 714 | A/R | A/R | N/A | N/A | x | x |
| 715 | ZERO | A/R | | x | x | , |
| 716 | 10 | 110 | | x | x | |

FIGURE 7C

COLLECTING ASYMMETRIC DATA AND PROXY DATA ON A COMMUNICATION NETWORK

REFERENCE TO RELATED APPLICATIONS

This application claims priority to: 1) provisional application Ser. No. 61/472,189 filed Apr. 5, 2011 and entitled: "Intercepting Asymmetric Data on a Communication Network," which applications are all also incorporated by reference herein in their entirety.

FIELD OF TECHNOLOGY

This disclosure relates generally to the technical fields of network communication, and in one example embodiment, this disclosure relates to a method, apparatus and system of collecting asymmetric data and proxy data on a network.

BACKGROUND

An analyst may want to monitor a set of users or a set of online identities associated with the set of users to observe their behavior online. The analyst may already be monitoring a set of known users of the communication network. The analyst may have previously identified a set of known users based on a set of identifier characteristics. The analyst may also be interested in locating other new users or new online identities of interest based on a set of desired identifier characteristic. The analyst may be interested in finding other users based on a set of desired characteristics or a type of project or application he may be working on. The analyst may be interested in understanding and studying a whole set of online behavior associated with the user or online identity associated with a person of interest. The analyst may want to study a set of communication and transaction data created and exchanged between a known user of interest of the communication network and a new user of interest. The analyst may want to collect a set of data belonging to the user of interest and/or a new user of interest to study a particular pattern in behavior. The analyst may also want to understand a set of interactions between the user of interest and a user not currently of interest or a new user of interest. Similarly, the analyst may seek content and metadata communicated between users on a wide variety of communication systems and formats. This information can be useful for determining commercial, investment, and personal information and relationships between the users or online identities and persons at large.

A network monitoring system may be required to monitor a set of activity between users and/or online identities associated with a set of persons. Some users of a communication system may be easily identifiable. However, other users of a communication system may be of interest, but may not yet be identified or provisioned easily. These users and/or online identities may be difficult to locate, and analysts may have a difficult time finding links between existing online identities and other potential online identities manually. Finding links between known users and new users or online identities related to the known user users may be time-consuming and inefficient task. In addition to being cumbersome and inefficient, it may also be financially expensive to identify new users of interest manually.

Such systems of network monitoring can be very expensive to purchase or lease due to the high development and design costs required for the sophisticated algorithms and software as well as the high-performance hardware, server infrastructure and other system features. There may be multiple analysts who may be part of various organizations, or agencies that may each want to monitor their own list of users that are of interest to them. These analysts from different agencies may want to use their own individual management protocol, judgment, and techniques for network monitoring and data gathering. However, sometimes these different agencies might be tracking the same users of interest and retrieving the same collection and transaction data without knowing it. But because each agency, organization or analyst has to maintain confidentiality of its work, the agency may typically have to have its own monitoring system. However, it can be very expensive for each individual agency, many with a limited budget, to purchase and maintain a system by itself. Sometimes purchasing or maintain a network monitoring system can be cost prohibitive, resulting in inferior, or severely handicapped, monitoring, collecting, and/or analyzing of data, Additionally, multiple different network carriers sometimes use the same backbone fiber routes to communicate data. If a network monitoring system has to be purchased for each carrier, then there might be duplicative resources tapping along the same route.

Identifying a user of interest on a communication system may be a starting point for collecting data on a network, like searching for the user of interest via chat handle, user name, etc. However, a subsequent task of accurate and timely collection of asymmetric data that is somehow associated with the user's communication may be more challenging. Asymmetric data may refer to many different types of related data, such as any type of data sent by a network user in addition to a given communication. Asymmetric data may refer to any communication related to any original or primary communication, but that is asymmetric in terms of: a time communicated on the network, a source providing the data onto the network, a route chosen on network to send the data, an application type and protocol used to package and format data in packet sent on the network, and/or any changes to any of these settings on subsequent communications between any parties of interest that substantially complicate the task of gathering a communication between a requestor and a responder, a communication application, or any combination thereof and assembling it together into a meaningful and holistic package of what was communicated to whom and when, in its entirety. Thus, for example, asymmetric data can be an email attachment sent by a network user, e.g., a target, along with her email that in reality is actually sent on the network from the email provider's server farm most likely along a different network route than the user's email to which the attachment was attached and at a slightly different time from when the email was sent.

Asymmetric data can also include other web and non-web services used by the target user of a network and/or her responder, such as the Voice over Internet Protocol (VOIP), audio chat, video chat, file transfer protocol (FTP), photo sharing sites, collaborative remote PC screen sharing apps, online Web services, etc., in any combination and permutation and being used in parallel or at different times. Asymmetric data can include any of the communications mentioned above, that are sent via different networks, e.g., a public wireless fidelity network (WiFi) access point, a user's Internet Service Provider (ISP), a neighbor's unsecured wireless network, etc. Asymmetric data can also include a responder's communications back to the target, in any of the web and/or non-web services mentioned above, typically sent via a route that is different from the target/requestor's route, for purposes of security, e.g., as a standard security measure by the ISP in trying to avoid the capture of the two-way conversation from a single line tap. In short, the accurate and timely collection of asymmetric data of unknown content that might exist in some indeterminate routing and timing in one or more networks that route terabytes of data for millions of users can be a daunting task.

Furthermore, with many users of a network anonymously hidden behind a proxy server, e.g., a library, hotel, corporation, university, coffee shop, internet café, etc., it is difficult to correctly identify which data traffic belongs to a given target from the total aggregated traffic from the population of users behind a given proxy that is transmitted from the proxy IP address, to a network. With the complexity and proliferation of data communicated by a person using modern communication devices, hundreds or thousands of sessions with potential data to be gathered and analyzed can occur at any given point in time. However, because tens or thousands of users may exist behind a proxy, each with different and changing four tuples (e.g., a unique virtual combination of: destination IP, source IP, destination port number, source port number), the session information becomes indeterminate in finding and tracking communications of a given user initially or over time. Adding to this difficult problem are several challenging factors including: the compression and/or encryption of traffic data which removes some of the packet header information otherwise useful in determining identity of sender(s) and recipient(s); the use of one or more firewalls and their use of Network Address Translation (NAT) that reformats otherwise readily apparent and useful IP address into information to cannot accurately identify a given user; the use of encryption, e.g., 128-bit or Secure Socket Layer (SSL), in key communications such as authentication of user, use of tokens, etc. that contain user-specific information that again would otherwise be useful in an intercept system trying to locate a specific user; ever changing network routing due to the traffic variability, unpredictability, and intentional security protections.

If a method or apparatus used to collect information of a target on a network is inaccurate or inefficient, it can result in over-collection of information, e.g., gathering and processing unwanted information beyond the communication and asymmetric data belonging to the target and user to whom he/she is communicating. Over-collection may raise privacy issues in some jurisdictions, and in all jurisdictions it may result in a potential overload with an extreme case of crashing the monitoring system.

Tapping a line close to an actual target network user may be sufficient to capture a communication along with its asymmetric data, regardless of the source, route, timing, etc. occurring out on the network, because all the information to and from a user becomes increasingly deterministic the closer the tap is placed to the actual user, e.g, tapping an actual single line going into the residence is most accurate. However this method can be unacceptable because it is expensive, labor-intensive, time-consuming, manual, potentially harmful re: loss of evanescent evidence due to delay, insufficient for mobile applications and mobile users, not easily scaled for future use and large networks and countries, and because of its other inadequacies.

SUMMARY

This disclosure relates generally to the technical fields of network communication, and in one example embodiment, this disclosure relates to a method, apparatus and system of collection of data on a network.

In one aspect, on a network monitoring system (NMS) coupled to a network, a method of collecting a collateral and/or asymmetric data stream on the network, the method comprising receiving a user of interest to be monitored on the network, collecting a first data stream of the user of interest on the network based on a type of the user of interest, identifying a type of application being used by the first data stream, creating a new search term that is specific or unique to an asymmetric data stream associated with the first data stream based on an upper layer of a communication protocol used by the first data stream and collecting the asymmetric data associated with the first data stream based on the new search term.

In another aspect, the application discloses, a network monitoring system comprising an access device for retrieving data from a network and a metadata processing device operative to identify a type of application being used by the first data stream, create a new search term that is specific or unique to an asymmetric data stream associated with the first data stream based on an upper layer (Layer 5-7 in OSI) of a communication protocol used by the first data stream and collect the asymmetric data associated with the first data stream based on the new search term.

In yet another aspect, the method comprises receiving a user of interest to be monitored on the network, collecting a first data stream of the user of interest on the network based on a type of the user of interest, identifying a type of application being used by the first data stream, creating a new search term that is specific or unique to an asymmetric data stream associated with the first data stream based on an upper layer of a communication protocol used by the first data stream, wherein the upper layer of communications is a communication layer 5, 6, or 7, or combination thereof of Open Systems Interconnection (OSI) model, collecting the asymmetric data associated with the first data stream based on the new search term, broadcasting the new search term one or more probes in the NMS in order to search for the new search term across a wider expanse of the network, wherein the new search term is sufficiently accurate or unique to reduce or prevent over-collection, but sufficiently general to capture future changes to application protocol, thereby retaining a legacy search capability, determining a protocol that is specifically, or is uniquely, applicable to layers 2, 3 or 4 in combination with layer 5, 6, or 7, or combinations thereof, of OSI model.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE VIEW OF DRAWINGS

Example embodiments are illustrated by way of example and not limitation in the figures of the accompanying drawings, in which like references indicate similar elements and in which:

FIG. 7A is a case table illustrating data entry to data mediation engine and access function, showing several different possible combinations of monitoring scenarios for users of interest and users not currently of interest communicating on a network, according to one or more embodiments.

FIG. 7B is a case table illustrates functions of access and mediation, mass metadata processing, and circular buffer functions of data collected from users of interest and users not currently of interest communicating on a network, according to one or more embodiments.

FIG. 7C is a case table illustrating collection and analysis of data provided by the network monitoring system for GUI display, according to one or more embodiments.

Figure 1:
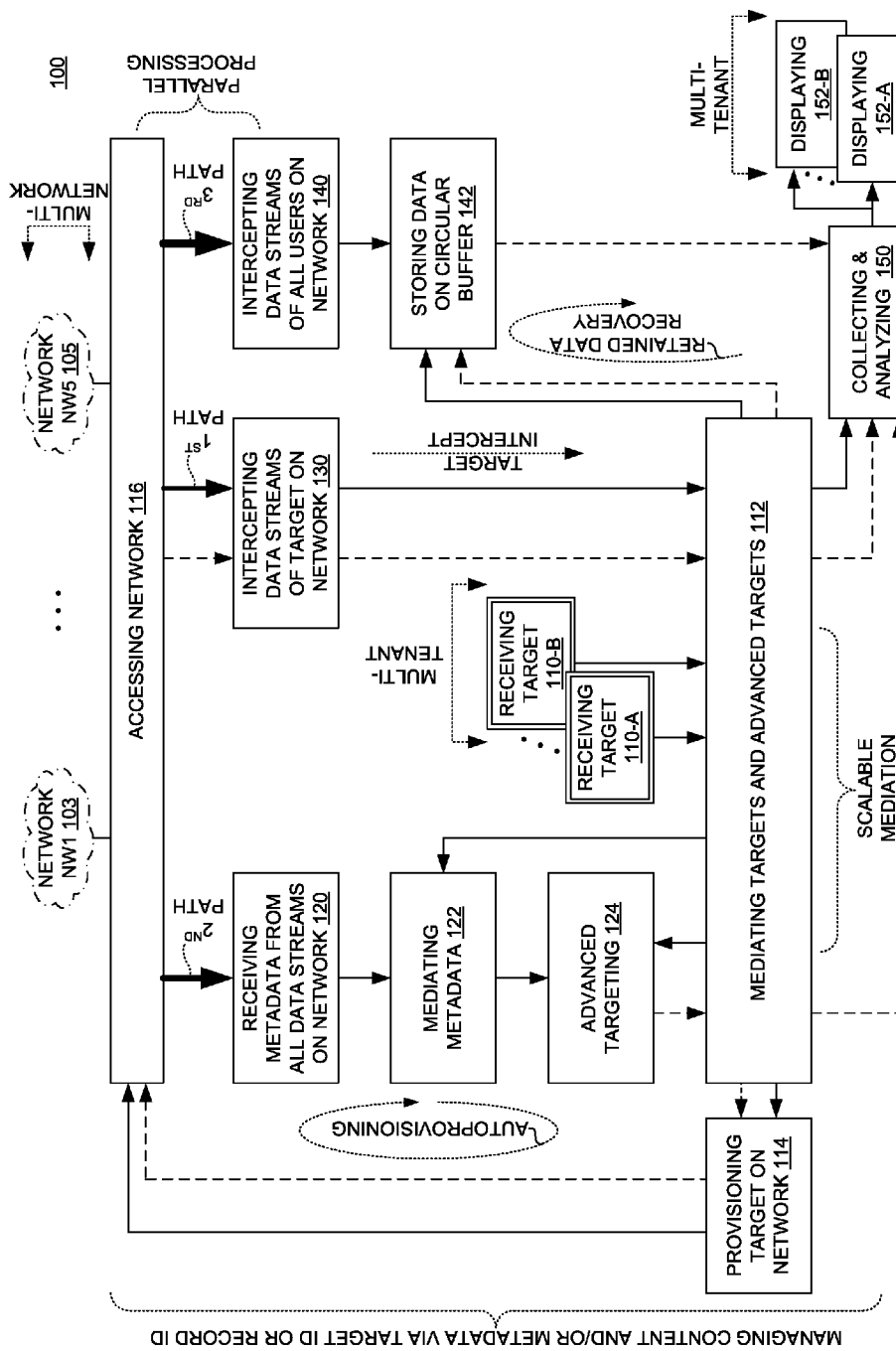
FIG. 1 is a functional block diagram of a network monitoring system, according to one or more embodiments.

Other features of the present embodiments will be apparent from the accompanying drawings and from the detailed description that follows.

DETAILED DESCRIPTION

A method, apparatus and system of a hierarchy of a structure of a volume is disclosed. In the following description, for the purposes of explanation, numerous specific details are set forth in order to provide a thorough understanding of the various embodiments. It will be evident, however to one skilled in the art that various embodiments may be practiced without these specific details.

An analyst who may be part of an agency may be interest in monitoring a set of communication and transaction data associated with a set of users of interest. These users who are communicating on a network may be of special interest to the analyst for one of many reasons. The analyst may be interested in identifying a set of new users of interest communicating through a communication network or any network based on what the analyst is looking to monitor. These users of interest may be of interest to many analysts. The analysts may work for an agency, an organization a company, a business or any other entity and may be interested in monitoring a set of users communicating over a network for many reasons. For example, an analyst may want to monitor consumer behavior of a set of consumers and be interested in understanding his online behavior. Therefore many analysts, working at different agencies or organizations may be interested in monitoring an activity associated with the same user of interest. However, the analyst may also need to maintain some confidentiality. Also, the different agencies may not want to share their analysis of the same set of communication and transaction data with each other and may have their own way of functioning. Therefore, multiple analysts may want to monitor the same user of interest. The network monitoring system may allow multiple analysts to access, analyze, monitor, and work on the same set of communication and transaction data while maintaining norms of security and confidentiality within the agency or for the particular analyst.

The network monitoring systems and architecture may utilize hardware and software solutions that may be segregated into three primary functional groups, or stages, called: access, mediation, and collection.

The term 'access' refers to the function of literally accessing data from a network. Thereafter, the data is similarly communicated to mediation equipment.

Typically, communications associated with known users of interest interacting on a network are sought by analysts who are monitoring a particular system. A known user of interest may refer to a specific person, online entity or any entity communicating on a specific medium and format. For example, an analyst may monitor a particular online identity xyz@gmail.com who might be communicating via email on the Internet at any time during the day. The analyst may be interested in collecting a set of information and data associated with a set of communications between the online identity xyz@gmail.com and all correspondences of the online identity, in one example.

Mediation may refer to the hardware and software solutions that provide the function of literally 'mediating' between the analyst and the system itself with its access function and collection function of data.

The collection function may refer to the hardware and software solutions that further organize, analyze, and provide the data to the analyst and the solutions that may interact with the analyst typically via a graphical user interface (GUI), to locate and identify meaningful data. The type of data may be a set of communication and transaction data associated with a user and/or online identity. The set of data may further be broken down to: content and metadata.

The set of communication and transaction data may consist of a metadata (e.g. IP address, email address, cyber-address recipient address, sender address, time of the email, time of the mail, information on a post card, etc.). The metadata may be information about the data in one or more embodiments. The metadata may encompass a time and place that the data was received. The metadata also encompass a set of information related to the senders and receivers of the information, a time of a communication event, or where information was collected from. For example, if an email is sent to the POI, the metadata may consist of the sender and recipient addresses of the email, an IP address and a time of the email among others. In one or more embodiments, the metadata may also be a cyber-name, a cyber-address, contact list, an analyst login information, a chat IP address, a chat alias, a VOID address, a web forum login, a website login, a social network login, a sender and/or receiver of a chat, a time of a chat conversation, a file name sent in a chat or an email or any other cyber-communication, a number of files transferred in the cyber communication, a type of chat text, a name of an audio and/or video attachment sent in the cyber communication, a number of parties involved in a communication, a buddy list, an avatar description associated with the cyber communication. The metadata may also be associated with voice and/or voice over IP communications. The metadata may also be associated with social networking sites, and may include an analyst name, a time of a social networking communication or publication, a size of a social networking communication, a number of followers and others. The metadata may also include telephone numbers, phone numbers, IMSI information and/or IMEI information.

The set of data may also consist of a content. The content may be the substantive part of the data collected. The data may consist of the actual text of the email, attachments in the email and what the information actually says. Similarly, the content may include the substantive portion of a record. In addition to the text of the communication, or a transcript of a recorded conversation, it may also include a text of an email attachment, a transferred file, a content of an uploaded or downloaded document/video or any other file, a pooled information between many users of a network, a substance of social network communication, a tweet, a message exchanged between two parties, a substance of a text message, and any other communication.

Function Block Diagram

Referring now to FIG. 1, a functional block diagram 100 of a network monitoring system (NMS) is shown, according to one or more embodiments. The functions shown herein represent a high-level overview of the functionality of the NMS to be implemented in hardware, software and methods that are described in subsequent figures. A starting function is known user receiving block 110-A and optional known user receiving block 110-B which act as an interface to receive known user data from an analyst, either manually or electronically, which is then passed to a known user mediating function block 112 for mediating the known user of interest based on predetermined criteria for identification of users on the network as well as for resource allocation. The present disclosure provides for one NMS to receive known user inputs from a plurality of analysts, e.g., via known user input blocks 110-A and optional 110-B; hence it is referred to as multi-tenant capable. Once approved, known user information, shown as a solid line, is passed to functional block 114 for provisioning an accessing function 116 to the appropriate networks, e.g., Network NW1 103 and NW5 105, which would then actually access and collect data from the appropriate networks to be monitored. The present disclosure provides for one NMS to access a plurality of networks with a single NMS system; hence it is referred to as multi-network capable.

Portions of data collected from the network by access functional block 116 are communicated parallelly on multiple paths to first, second, and third path, or any combination thereof, then serially communicated down each multipath for subsequent processing and analysis. In particular, a first data path, or first path, couples accessing function 116 to collecting function 130 that collects metadata and/or authorized or desired content, of data streams collected from the network for known users of interest (shown as solid lines) and for new users of interest, (shown as dashed lines) and for optionally storing data. In one or more embodiments, a new user of interest may be a user of the network who was previously not of interest to the analyst, but may be of interest to the analyst based on criteria determined by the system. In one or more embodiments, the system may auto provision these new users of interest indicating to the analyst that his new user of interest warrants his attention. This collected data is communicated to: mediation block 112 for subsequent processing such as assembling data streams into communications, such that packets of fragmented data can be reconstructed into more meaningful and readable messages, and for temporarily storing them prior to communicating them to collecting and analyzing functional block 150; and subsequently displaying data and relationships to GUI functions 152-A and optional 152-B, for interacting by one or more analysts.

A second data path includes an collecting function 120 coupled to accessing function 116 that receives metadata, but essentially no content data, from any quantity of users of the network, including an option to collect and communicate metadata to a metadata mediating function 122 from either every available data stream of a single user on the network to every available user on the network, e.g., mass metadata, or any quantity of users or population definition of users in between. Mediating the metadata includes: primarily extracting the metadata portion of the data stream and discarding the balance of the data stream; establishing possible relationships between the communicated data; temporarily storing this data therein; delivering the metadata to other engines; and receiving feedback of known user data, e.g., from known user mediating function 112. After mediating the data, the relationship information and metadata itself is communicated to the advanced targeting function 124 which identifies a new user of interest to be monitored on the network, and communicates it, as indicated by the dashed lines, to the mediation function 112 to then be provisioned per provisioning function 114 on accessing network function 116.

The new user of interest and metadata analysis information can also pass to collecting and analyzing function 150 for displaying the results of the metadata, either directly, or in conjunction with data from mediation function 112. Together, the function of generating a new user of interest, based on relationships algorithmically determined between metadata from collected data streams of both known users and users not currently of interest may be referred to as auto-provisioning. That is, the new user of interest is provisioned automatically without requiring an ab initio input from the analyst, thereby resulting in the collection of data streams more timely and with fewer resources.

A third data path from accessing function 116 to collecting function 140 collects data streams from the network and communicates them to storing data function 142 for storage of data. Third data path in one embodiment neither dissects data streams, e.g., content from data, nor, process them beyond tagging, storing, retrieving, and overwriting them. Thus, the third data path can store any desired portion of data, whether the data originating from the known user of interest or from a user not currently of interest regardless of whether the data is and metadata or content. In one embodiment, third data path stores both content and metadata for every available data stream of all available users on the network and communicates them to circular buffer functional block 142 for storage of data. In one or more embodiments, all users of the network may comprise of known users of interest, users currently not of interest and new users of interest. However, many different embodiments can be realized with third data path, from recording different portions of a data stream, e.g., content or metadata, for any population of communication network users, with any kind of retention duration algorithm.

Known user mediating function 112 can request retained data associated with known user of interest and user not currently of interest from storing data function 142 for retrieval and communication to collecting and analyzing block 150 and subsequently to displaying data GUI function 152. Thus, collecting and analyzing function 150 can receive data from a plurality of sources via mediation function 112, including essentially real-time collected data streams for known user and new user of interest from function 130, real-time metadata from advanced targeting functional block 124, and retained, or saved and collected, data from circular buffer function 142. The latter function is referred to as retained data recovery.

By tagging, e.g., in a header, each collected data stream with an identifier, i.e. a known user identification (ID) that is unique to the NMS, the collected data can be routed and managed through the network monitoring system as traditional data packets. A database, look up table (LUT), or any other system for tracking data can be utilized by components in the NMS to cross-reference the unique identifier in the data stream with details about the data stream including known user of interest status, analyst administration details, and other useful fields.

Overall, functional block diagram 100 illustrates several features including: a multi-path approach for parallelly processing different levels of metadata and/or content from users of a network; a dynamic feedback retrieval system for identifying new users of interest, using among other things metadata from all users on a network in conjunction with data from a known user of interest; auto provisioning of the new users of interest to access functions for collecting data; recovery of retained data based on known user of interest or new user of interest needs; mediating of collected data using scaled mediation functions; managing packets through the NMS via known user ID; and collecting and analyzing functions of data received from a plurality of parallel sources.

System Architecture

Figure 2:
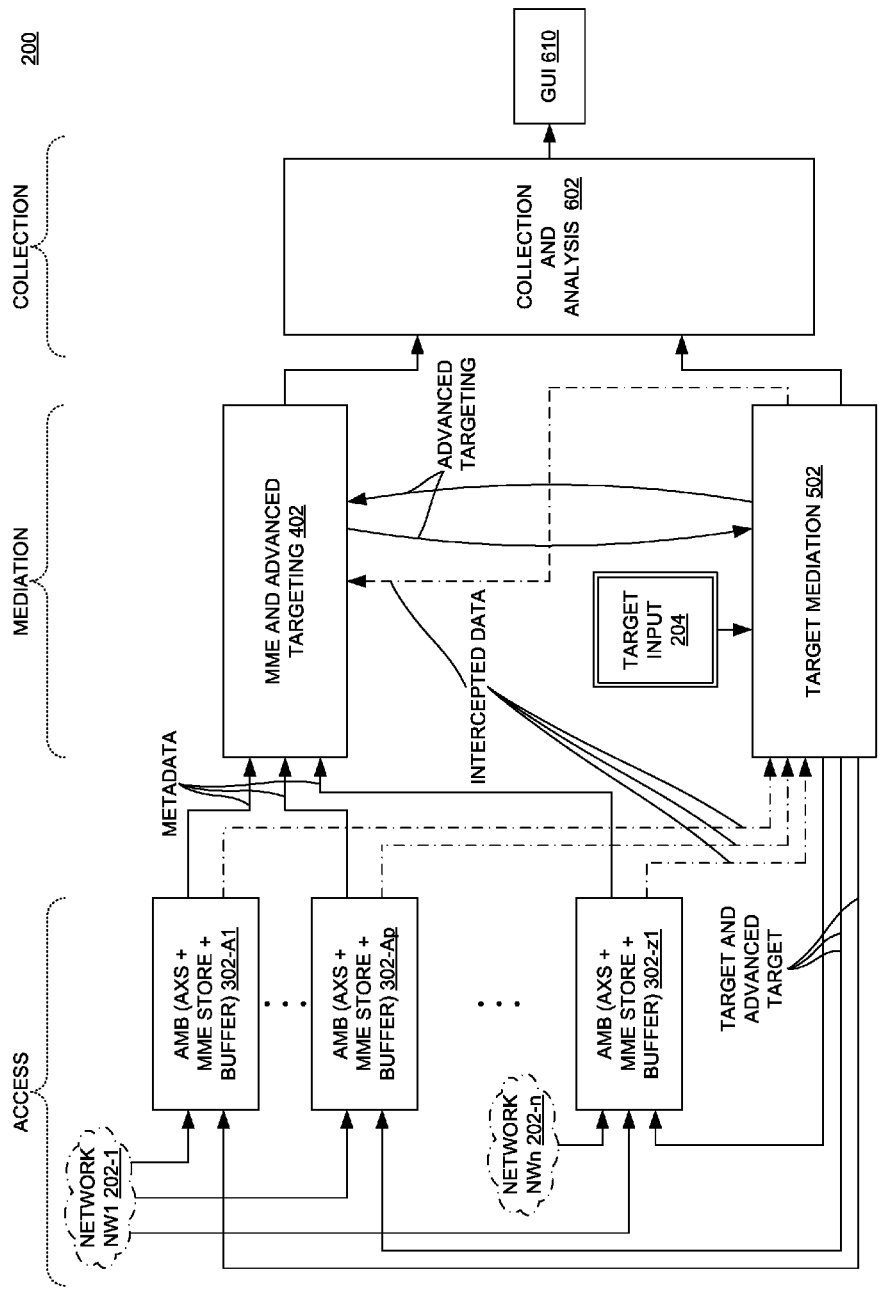
FIG. 2 is an architecture layout of the network monitoring system as applied to a plurality of networks, according to one or more embodiments.

Referring now to FIG. 2, an architecture layout of the network monitoring system (NMS) 200 as applied to a plurality of networks is shown, according to one or more embodiments. Known user input block 204 is a graphical user interface (GUI) that can be a centralized data entry point or a distributed and remotely accessed interface that performs the known user entry function of block 110 of FIG. 1. Input block 204 can be hardware and software such as a computer system with keyboard data entry, scanner and optical character recognition, or any other system to enter data. While only one known user input block 204 is shown, the present system is capable of coupling a plurality of known user input blocks, where one or more can be utilized by one or more authorized analysts. Data mediation engine 502 receives known user of interest information from known user input block 204, to which it is coupled, and mediates the known user of interest information per the functionality of block 112 of FIG. 1. Data mediation engine 502 can process collected data streams from known users of interest and users not currently of interest via standard scalable network components as described in subsequent FIG. 5, or it can use an application specific integrated circuit and hardware One or more Access+Mass Metadata extraction (MME) storage+Buffer devices 302-A1 to 302-Ap and 302-z1 are coupled on the backend to data mediation engine 502 to receive instructions on the known user of interest and the new user of interest that they should collect on one or more networks, e.g., NW1 202-1 and NWn 202-n, where n and p>0. An access device, e.g., 302-z1 can be coupled to a plurality of networks, e.g., 202-1 and 202-n, or a plurality of access devices, e.g., 302-A1 and 302-Ap can be coupled to a single network, e.g., NW1 202-1. AMB devices 302-A1, to 302-Ap and 302-z1 utilize hardware and software described in subsequent FIG. 3 to perform the functions of FIG. 1 including: access network functional block 116; collecting metadata of at least one or of all data streams per block 120; collecting data streams of known users of interest 130; and collecting data streams of all users 140. Instructions may be communicated to access devices via secure, or encrypted, links on wired systems, wireless, satellite, etc.

Access devices 302-A1 to 302-Ap and 302-z1 are also coupled to a plurality of processing devices on the frontend, and particularly to: a mass metadata extraction (MME) and advanced targeting engine, or metadata mediation engine, 402 that receives metadata; and to data mediation engine, 502 that receives collected data. Data mediation engine 502 performs the mediation function 112 of FIG. 1 where it mediates the known user of interest against predetermined rules and criteria for identification and data collection on the network as well as against available resource allocation. Data mediation engine 502 then communicates processed data from known users of interest and new users of interest to collection and analysis engine 602, and also to metadata mediation engine 402 for processing against metadata from all users or a portion of users, e.g., to find meaningful relationships, correlations of data, and other insights into relationships between known users of interest to other known users of interest and to users not currently of interest, which can be output to GUI 610, e.g., data monitors. Meanwhile, metadata mediation engine 402 is also coupled in parallel to data mediation engine 502 to send and receive data regarding new users of interest.

NMS 200 is modular, such that an analyst can build up or scale down the functionality to a system as budget and need dictates. Thus, a core function of collection of data of a known user of interest can be a starting function, with an upgrade of autoprovisioning via metadata mediation, or an upgrade of retained data recovery via circular buffer being modularly addable. Thus hardware integration and expansion can be implemented with software upgrades and interface sensing techniques that allow the NMS 200 to detect the hardware and provision the system to implement the increased or decreased functionality.

Figure 3A:
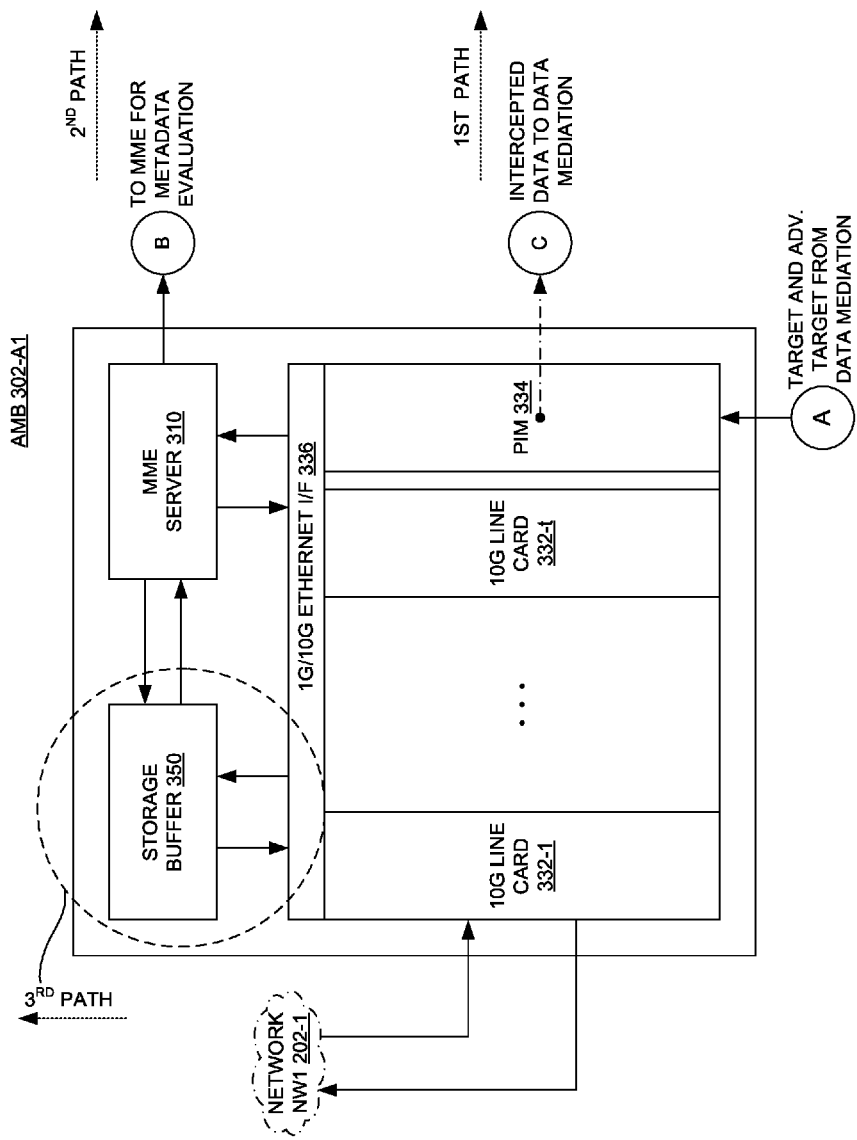
FIG. 3A is a block diagram of an access device+mass metadata server+storage buffer engine of the network monitoring system, for collecting data on a network, according to one or more embodiments.
Figure 3B:
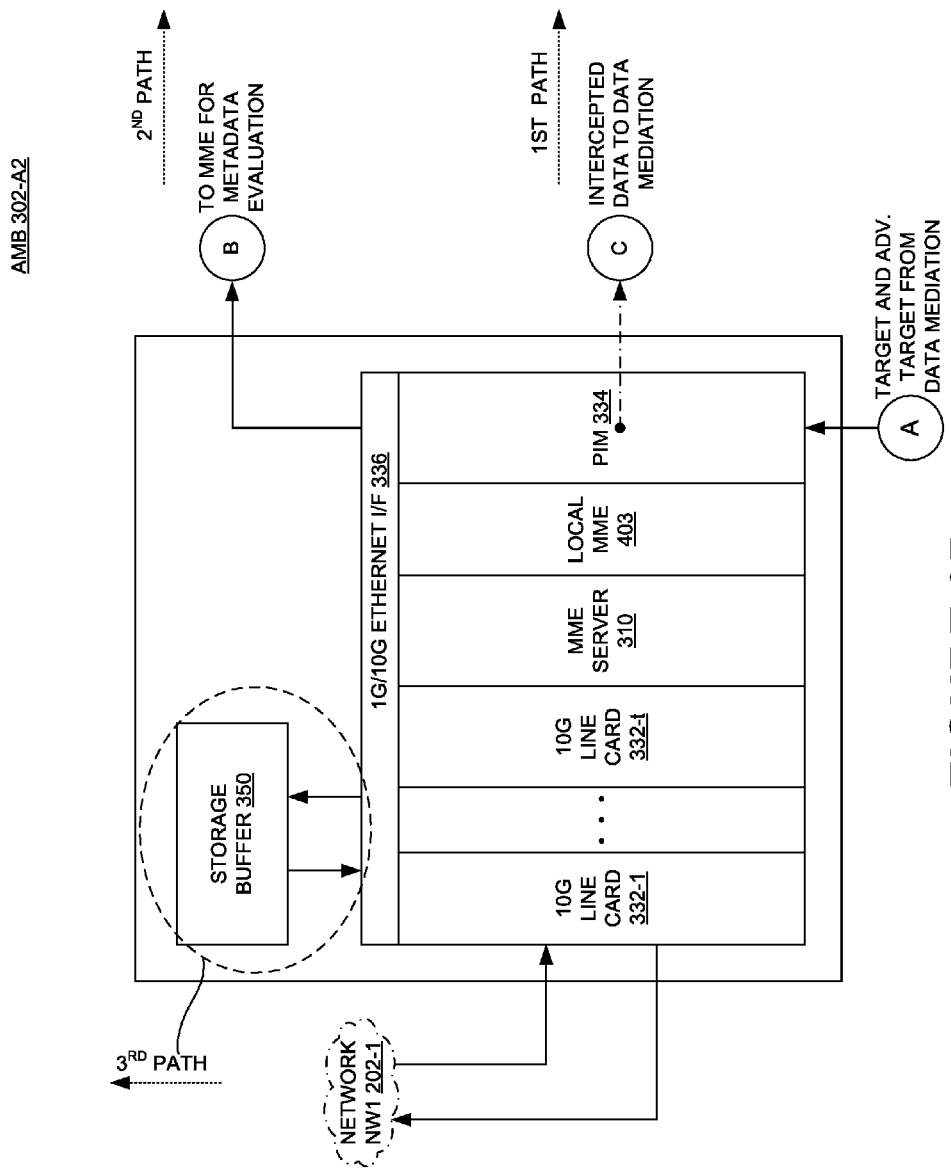
FIG. 3B is a block diagram of an access device+mass metadata server+storage buffer engine with local mass metadata extraction engine and local mediation of the mass metadata extraction data in the network monitoring system, for collecting data on a network, according to one or more embodiments.

Referring now to FIG. 3, a block diagram of the access device+mass metadata extraction (MME) server+storage buffer (together "AMB") engine 302-A1 of the network security system is shown, for collecting data on a network, according to one or more embodiments. Access function 116 of FIG. 1 is implemented in Access engine 302-A1 via a scalable quantity of line cards, i.e., 10 Gigabit, or 10 G, line cards 332-1 through 332-t with t>0, being receive cards as required to collect content and metadata from all available traffic on the network, i.e., NW1 202-1, and to communicate it with other components in the network security system. Line cards 332-1 through 332-t receive data streams from the network via any commercially available or proprietary access device coupled to the network to collect the data streams used by the known users of interest. The access device can be a passive probe tied or tapped into a junction on the line of the network or it can be an active port to a network router, both of which are known to those skilled in the art; collecting the data streams of the known user on the network; optionally capable of tagging the data streams of the known user of interest that are being collected from the network with a respective known user ID or record ID; and transmitting the data streams of the known user to the NMS for subsequent analysis.

Ethernet interface (I/F) 336 with 1 G/10 G capability and optional legacy compatibility, i.e., with 10/100/1000M bit/sec, communicates the full content and metadata of all available traffic on the network to the following coupled devices: 1) an MME server 310; 2) a peripheral control interface (PCI) mezzanine card (MC) input/output (I/O) module (together "PIM") data card 334 and 3) a storage, or circular buffer 350. Note that any communication protocol can be utilized between engines or components in the NMS, e.g., 40 G/100 G, etc., while still meeting the functionality, methods, and overall system architecture and benefits of the present disclosure.

MME server 310 buffers and transmits metadata for users on the network to the metadata mediation engine 402 of FIG. 2, e.g., via connection "B," thereby satisfying function 120 of collecting metadata as second data path shown in FIG. 1. MME server 310 also functions to buffer and manage data to account for differences in line speed, line failures, data backup, and other system interconnectivity issues that inhibits continuous and real-time data streaming between the components.

PIM data card 334 is essentially the gate keeper for what portion of the data stream gets directed to the first data path of known user mediation and the second data path of metadata mediation for the NMS. For example, PIM data card 334 can send the first few packets having raw metadata for a session for all users to the MME server 310 for subsequent transmission to metadata mediation engine 402 for processing metadata. Similarly, the PIM data card 334 can send the entire data stream for known users of interest, including the first few packets having raw metadata and the subsequent packets containing the content, to the data mediation engine 502, shown in FIG. 2, e.g., via connection "C," thereby satisfying function 130 that monitors and stores data streams of known users as first data path, as shown in FIG. 1. Metadata belonging to the known user of interest is stripped out by data mediation engine 502 and communicated to, and processed in parallel by, metadata mediation engine 402, e.g., as tracked by a common known user ID as shown in FIG. 2. PIM data card 334 can be a commercially available card, or a proprietary design PIM card capable of communicating with the packets as described herein.

Storage, or circular, buffer, or drive, 350 receives and stores metadata and content of desired users, which can include known users of interest, users not currently of interest and new users of interest on a network, via the Ethernet interface card 336. Storage buffer 350 satisfies circular buffer functional block 142 and collecting function 140 as third data path, as shown in FIG. 1 for temporary storage of all metadata and content collected for every available data stream of all available users, in one embodiment, on a network. Storage buffer 350 can be any size buffer device, translating to a time limit of original stored data for a given data rate, with optional expandability, and various data management techniques for interruption, recovery, and preservation of strings of critical data. Storage buffer can be accessed to recover retained data that was collected from a known user of interest, a new user of interest or a user not currently of interest, via an analyst's request input from data mediation engine 502, e.g., via connection "A," or via an auto-provisioning function via MME server 310 from the metadata mediation engine 402 through data mediation engine 502. Storage buffer 350 can be any commercially available or proprietary design drive that will communicate with the system and store data.

Optionally, additional storage buffers, not shown, may be used in parallel with shown storage buffer 350. Additional storage buffers could use a hand-off technique whereby when a critical security event occurs, as notified by an analyst or an algorithm, e.g., sensing key terms or traffic from specific known users of interest, users not currently of interest or analysts, a first storage buffer that was actively recording data can stop overwriting its existing data, thus saving the most recent communications on the network at the time of the notice. This would provide a 'snapshot' of the existing communications on networks up to that point which can be downloaded to other storage devices, e.g., long term or off-site storage devices. Going forward, recording of current communications on the network is seamlessly transferred to the parallel circular buffer unit. Thus, the most recent past data is preserved, while current and future data is captured as well. In other words, multiple banks of storage buffers can serially store data e.g., via flip-flopping or round robin, until an event occurs, at which point, the most recent storage buffer changes to a download mode, while the unused storage buffer is swapped to assume the duty of recording current communications. Storage buffer 350 can be either an external unit communicating to access device 302-A1 or it can be a unit integrated into access device 302-A1. Storage buffer 350 is coupled to MME server 310 to provide data back and forth between the units.

While FIGS. 2 and 3 illustrate an integrated storage buffer 350 and MME server 310 located in each Access engine, e.g., as a card in a blade server, for element 302-A1, the present disclosure is well suited to implementing the functions in a distributed metadata server device and storage buffer device, either as a standalone or incorporated in another engine, i.e., the metadata mediation engine 402.

Figure 4:
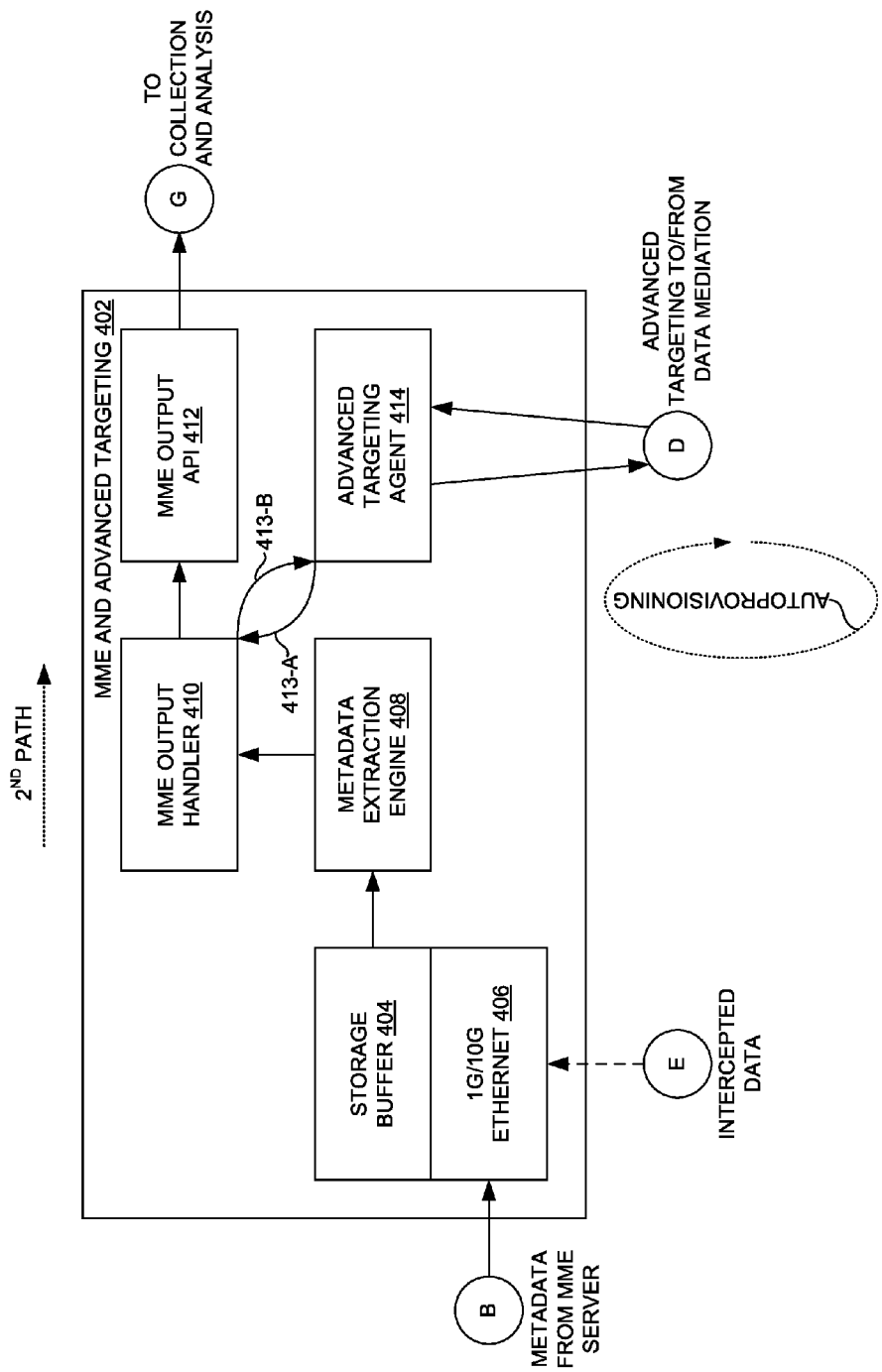
FIG. 4 is a block diagram of a metadata and advanced targeting engine portion of the network monitoring system for evaluating a metadata portion of the network traffic, according to one or more embodiments.

Additionally, while access device 302-A1 is illustrated for collecting data on communications on a hardwire communication system, e.g., electromagnetic signal communication on copper lines or electromagnetic light waves on a fiber optic line via taps, etc., it can also be implemented via receivers or probes on other communication links such as wireless, e.g., satellite, radio signals including microwave, cellular communications, etc., via either monitoring that link in its domain, e.g., wirelessly on the airwaves, or monitoring it in the wired domain, e.g., accessing cellular communications when transmitting through hardwire links in the mobile telephone switching office (MTSO) or via a subscribers wireless fidelity (Wi-Fi™) network Referring now to FIG. 4, a block diagram of a mass metadata extraction (MME) and advanced targeting engine, or metadata mediation engine, 402 portion of the network security system, for evaluating a metadata portion of the network traffic, is shown, according to one or more embodiments. Metadata mediation engine 402 embodies the metadata mediation functions 122 and advanced targeting function 124 of FIG. 1 for second data path.

MME and Advanced Targeting engine 402 includes a 1 G/10 G Ethernet or any physical L2 communication hardware device that transmits and receives IP packets 406 coupled to a storage buffer 404, for receiving and buffering the first few packets of raw metadata for each session, e.g., primarily for users not currently of interests received from MME server 310, via connection "B" from AMB engine 302-A1 of FIG. 3, and for receiving and buffering collected data, e.g., for known users of interest and new users of interest, via connection "E" from data mediation engine 502 of FIG. 1. Thereafter, both the first few packets with the raw metadata and the collected data is communicated to metadata extraction engine 408, which strips and retains, the metadata portion of the raw metadata and the collected data, and communicates the processed metadata to the MME output handler 410, while discarding the rest of the content. The MME output handler 410 groups, labels, and packetizes the metadata for subsequent communication to the MME output application programming interface (API) 412 for transmission to collection and analysis engine 602, via connection "G." Metadata extraction engine 408 is implemented in one embodiment using any commercially available deep packet inspection solution for inspecting and/or filtering of the packets for advanced network management, user service, and security functions as well as internet data mining and other functions.

Advanced targeting function 124 of FIG. 1 is specifically accomplished by advanced targeting agent engine 414 communicating with both MME output handler 410 for known user update 413-B and known user configuration 413-A as well as with data mediation engine 502 of FIG. 1, via connection "D." In particular, advanced targeting agent engine 414 implements algorithms and recursive analysis to infer relationships and correlations between known-user-data received from data mediation engine 502 and metadata portions of known users of interest and users not currently of interest collected from the network. The newly identified user not currently of interest is then labeled as a 'new user of interest' and communicated to data mediation engine 502 for provisioning on the network via the Access engine of FIG. 3. Storage buffer 404, metadata extraction engine 408, MME output handler 410, advanced targeting agent engine 414, and MME output API 412 can all be implemented as discrete devices or as integrated functions on a personal computer, minicomputer, server or other suitable device.

Figure 5:
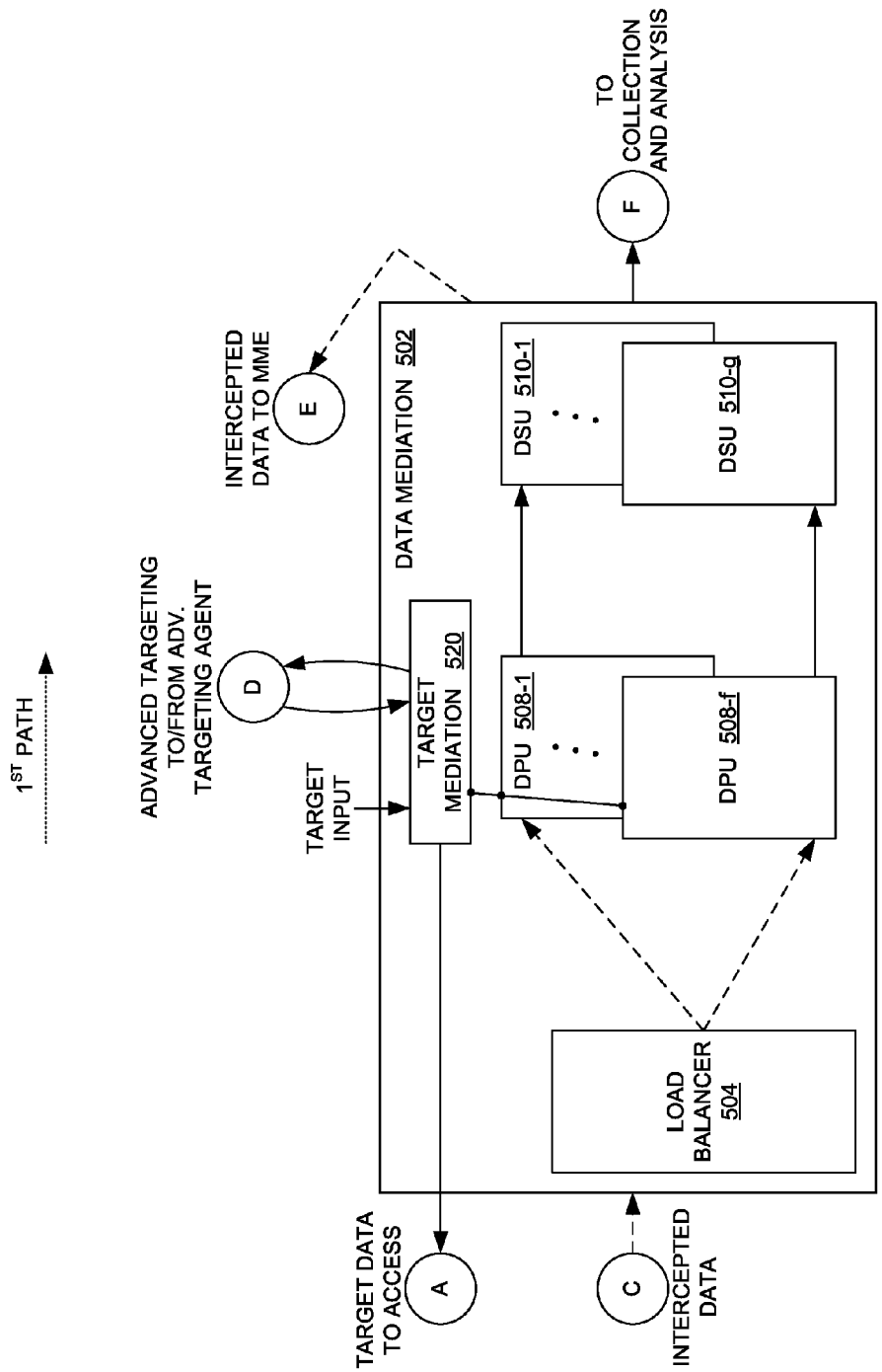
FIG. 5 is a block diagram of a data mediation engine portion of the network security system for provisioning users of interest to be monitored and for mediating collected data, according to one or more embodiments.

Referring now to FIG. 5, a block diagram of a data mediation engine 502 portion of the network security system for provisioning known users to be monitored and for mediating collected data is shown, according to one or more embodiments. Data mediation engine 502 embodies the mediation function 112 for known users of interest and new users of interest for both first data path and second path, as shown in FIG. 1.

Data mediation engine 502 includes a load balancer 504 for receiving collected data, including known users of interest and new users of interest, per connection "C," from at least one AMBs 302-A1 to 302-Ap through 302-z1, and spraying, or distributing, the data across one or more data processing units (DPUs) 508-1 through 508-f coupled to one or more data storage units (DSUs) 510-1 through 510-g, respectively, and together referred to as data processing engines, where f>0 and g>0 and in some cases f=g for matched paring between the units, though multiplexing can occur with f being different than g.

Figure 6:
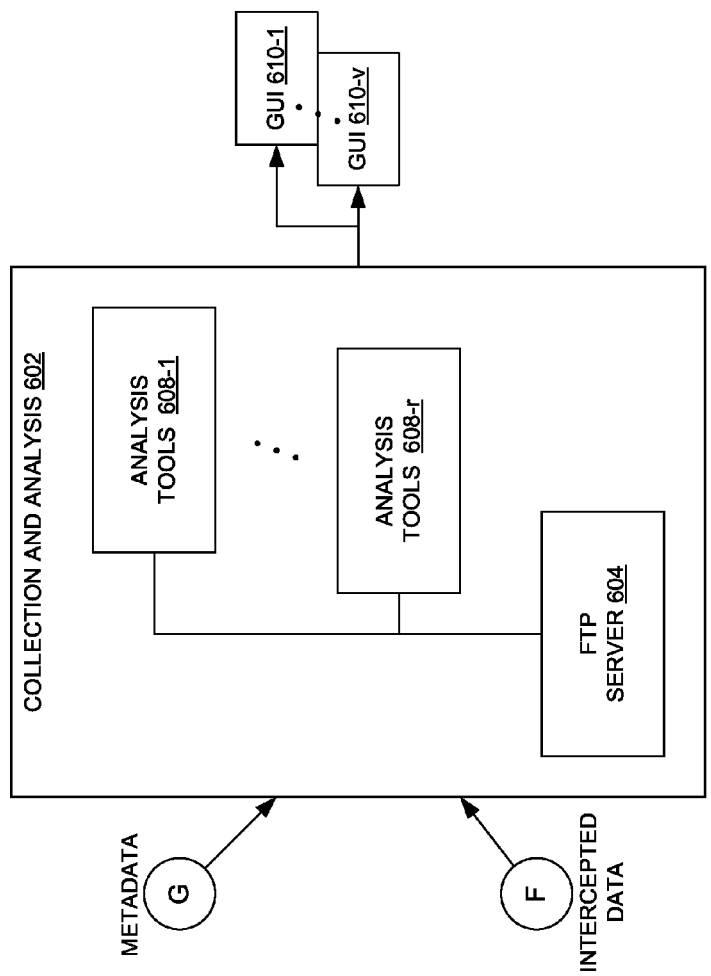
FIG. 6 is a block diagram of a collection and analysis engine portion of the network monitoring system for analyzing and presenting collected data to the network monitoring system user, according to one or more embodiments.

The DPUs 508-1 through 508-f, also known as an internetwork protocol data units (IPDUs), organize the collected packets for content delivery, eliminate any packets not authorized to be captured, fan-out packets destined for multiple analysts and ensure the packet is only sent once to an analyst that has multiple known users of interest that request the same packet and routes them to the DSUs for temporary storage for subsequent communication to collection and analysis engine 602 of FIG. 6, per connector "F." In addition, DPUs 508-1 to 508-f are coupled to target mediation engine 520 which receives potential new users of interest from metadata mediation engine 402 of FIG. 4, per connector "D," and compares them to known users of interest being processed in DPUs 508-1 to 508-f as well as performing administrative tracking and approval of potential new user of interest before provisioning them to Access devices 302-A1 to 302-Ap through 302-z1, via connector "A." DPUs and DSUs can be proprietary communication cards or off-the-shelf line cards. Any commercially available or proprietary-design DPU may be used for this function, given the adaptation and implementation of drivers specific to the actual device. Target mediation engine 520 can be implemented as a discrete ASIC device or as an integrated function on a personal computer, minicomputer, server or other suitable device.

While only one load balancer 504 is illustrated, the data mediation engine 502 can utilize any number of load balancers and any quantity of data processing engines to provide a scalable system based on the quantity of data streams, based on the data rates, and based on any other application or customer needs to provide a functional system. A modular network chassis can be utilized with any quantity of slots for line cards or application specific engines to accommodate data processing engines.

Referring now to FIG. 6, a block diagram of a collection and analysis engine 602 of the network security system for analyzing and presenting collected data to the analyst is shown, according to one or more embodiments. The collection and analysis engine 602 embodies the collecting and analyzing function 150 for collected data from the network, as shown in FIG. 1.

A plurality of sources provide information delivered to collection and analysis engine 602, namely metadata information via connection "G" from metadata mediation engine 402 of FIG. 4, and collected data via connection "F" from data mediation engine 502 of FIG. 5. This received information is interfaced by file transfer protocol ("FTP") server 604 and distributed in parallel to at least one scalable analysis tools engines 608-1 through 608-r, with r>0. In particular analysis tools engines 608-1 through 608-r can be proprietary application specific hardware tool, or can be a general processor such as a server. Analysis tools engines 608-1 through 608-r can be a combination of one or more analysis platforms or solutions provided by one or more companies. Analysis GUIs 610-1 through 610-v, where v>0, are multiplexed to analysis tools engines 608-1 through 608-r to allow concurrent access, such that security and confidentiality is maintained between multiple different analysts, while the multiple analysts are accessing and analyzing their authorized information on known users of interest and users not currently of interest on the NMS, e.g., using metadata mediation, target mediation, circular storage retained data recovery, auto-provisioning, and/or different analysis tools engines. Analysis tools engines 608-1 through 608-r can include proprietary tools known to those of ordinary skill in the art of network analysis. This enables the multi-tenant functionality of the NMS including a situation where same data of the known user of interest or user not currently of interest and/or analysis of the user is provided by a fanout feature to multiple analysts.

Servers mentioned hereinabove, e.g., MME server 310, server for metadata mediation engine 402, server for data mediation engine 502, or FTP server 604, or any other function in the scalable network monitoring system, can be any brand of server, e.g., Sun™, HP™, etc., and any type of server computer, e.g., application server, blade server or any processing device capable of performing the data management and communication functions with any quantity of cores, e.g., six (6) core X86 Intel Quad Xeon MP, which can be programmed for any type of operating system ("OS"), e.g., Solaris, UNIX, LINUX, or other computing OSs.

Case Table

Referring now to FIGS. 7A through 7C, case tables 700-A through 700-C illustrating several different possible combinations of known users of interest and users not currently of interest communicating on a network to be monitored are shown, according to one or more embodiments. Descriptions of columns A through column GG for case table are described immediately hereafter as exemplary fields, which fields are able to be reduced or expanded as desired by a given analyst. Column letters I, O, Q, S, X, and Z are intentionally omitted. The substantive entries for each case, e.g., each cell in rows 701-716 of data in the table, are fictitious and provided as arbitrary examples to illustrate the disclosure, and will be described in respective portions of flowcharts of FIG. 8. All or part of case tables 700-A through 700-C, and additional management data, can be implemented as a lookup table (LUT) in memory managed by a controller or microprocessor of NMS complying with protocol instructions, e.g., per the method of a first data path of metadata and content for known users, second data path of metadata only for some or all users, and third data path of metadata and content for all or selected users, as described for FIG. 1.

Referring now to FIG. 7A, a case table 700-A illustrating data entry to data mediation engine and access function, showing several different possible combinations of identification and collection scenarios for known users of interest and users not currently of interest communicating on a network, is shown according to one or more embodiments. Columns A through N2 of table 700-A illustrate data entry values provided to data mediation engine 502 via known user input block 204 shown in FIG. 2, viz., as input by an analyst. In particular, column A of case table 700-A is an authorization identification (AUTH ID), while column C provides a known user of interest, e.g., a known user name for an individual or a company name for a corporation, or a pseudonym, handle, nom de plume, nom de guerre, alias, chat room name, or other identifier. Column C also includes parenthetical names of users not currently of interest in rows 711, 712, and 713. Column D provides a known user type, such as the medium, link, channel, or other communication media or format on which metadata and content is communicated, thereby indicating what network or format should be provisioned for collection of data. Column E refers to a network identification (NW ID) on which the communication is sought. No column is provided for metadata, as it is presumed that metadata is available for monitoring on all users, including both known users of interest and users not currently of interest.

Column F refers to a third party ($3^{rd}$ PTY) to whom a known user of interest is communicating. Columns G, H, and J refer to timing of when monitoring is sought, e.g., a start day or date, a duration time or ending date, and times of day during a user prescribes monitoring, respectively. Column K lists the analyst, while the analyst's supervisor or manager is listed in column L, and while a pre-authorized contact identification (CONTACT ID) is listed in column M. Column N refers to a known user ID that is assigned by the network monitoring system to the unique case described in the table, e.g., the given combination of variables, or fields, for the given known user of interest. Similarly, column N2 refers to a record ID that is assigned by the network monitoring system as well, in order to unique case described in the table for known users of interest and users not currently of interest. Thus, with a unique known user ID and/or record ID, the data streams, or packets of data, can be tagged or wrapped, e.g., in the header of a packet, with the unique known user ID and record ID. This allows the packet to be processed in the NMS as a discrete and traceable packet on fungible or proprietary, and scalable, hardware and engines, seeing as the unique known user ID and/or record ID can be determined for a given packet, and thus its data can be collected and processed for the given known user ID. A NMS could deselect some of the variables listed in the columns or add other columns such as, for example: known user bio information such as social security number, driver's license number(s), etc., analyst information such as comments and suspected relationships to other known users, etc.

Rows 701 through 710 represent known users that are available to enter into an NMS at a given point in time. Row 716 is a known user of interest that only becomes known at a future point in time for entering into the NMS, and is thus segregated away from the known users of interest ready to enter immediately. Rows 711-713 are users not currently of interest presented in the table for comparison and explanation of subsequent steps on known users and new users, and are not typically entered into the LUT system for tracking known user IDs. Row 714 represents all known users of interest on all networks serviced by NMS while row 715 represents all users currently not of interest on all networks serviced by NMS; together which represents all available users on all networks serviced by NMS.

Referring now to FIG. 7B, a table 700-B, illustrating functions of access and mediation, mass metadata processing, and circular buffer functions, e.g., first, second, and third path of data processing of FIG. 1, for data collected from known users of interest and users not currently of interest communicating on a network, is shown according to one or more embodiments. Column N known user ID, and column N2 record ID, for known users of interest and users not currently of interest respectively, are repeated in table 700-B because the known user ID or record ID is retained with the collected data as it propagates through the NMS, and thus will be available to any engine in the NMS. Column D, known user type, is repeated in table 700-B for convenience of reading the table. Table heading "Access+Mediate" includes columns T through W which represent variables used in access device 302-A1, or access portion thereof, of FIG. 3 and data mediation engine 502 of FIG. 5 for processing of the data streams. In particular, column T identifies the Mediation user ID, for an administrator or analyst that has access to the mediation functions of the NMS. Column T indicates an Access probe ID used to collect data on a given network. In some cases, multiple probes will be used on a network, and thus, both probes may have to be provisioned and tracked. The probe IDs and network IDs used in tables 700-A and 700-B are exemplary and do not necessarily match NW IDs shown in preceding hardware figures. Column V indicates which known user of interest and which user not currently of interest has mass metadata engine input (MME INPUT) to the NMS. Because all metadata is accessible by the NMS, including both known users and users not currently of interest, every row has a check. However, the analyst can selectively gain metadata information for whichever known users or users not currently of interest desired, possibly based on prioritizing limited resources to only known users and to suspicious users not currently of interest for a high-data rate scenario. Column W refers to communication, e.g., for content of communication, which in most scenarios are limited to known users. Table heading "Circular Buffer" includes column Y which indicates which data is being recorded in storage, or circular, buffer 350 of FIG. 3.

Table heading "MME" includes Column N; known user ID, again for the MME function performed on the data. Column AA indicates whether the Metadata is recorded and evaluated by the MME mediation engine; while column BB indicate whether an analyst has a relationship to a known user of interest, e.g., to known user ID of "2" in this example; and while column CC indicates whether a newly auto provisioned new user of interest was established by the MME function.

Referring now to FIG. 7C, a table 700-C, illustrating collection and analysis of data provided by the network security system for GUI display, is shown according to one or more embodiments. Table 700-C includes column N known user ID, and column N2 record ID, as these identifiers travel with the data stream through the NMS for known users and users not currently of interest respectively. Table heading "Collection-GUI Output" includes: column DD for memory location in the FTP server 604 of FIG. 6; column EE to indicate content available to GUI output, column FF to indicate metadata available to GUI output, and column GG for dossier information available to GUI output, e.g., a summation of known user and user not currently of interest related information and other analysts comments and analysis. Note that memory location per column DD for common known users of interest has row 702 utilizing memory locations M1+M2 and row 705 utilizing the same memory locations M1+M2, seeing as their known user data matches in important areas, such as same known user of interest, same time of collection, etc., per Table 7A that would allow the access to that same data by different analysts, thus saving memory by storing the data once, all while maintaining confidentiality and security between the two analysts, for multi-tenant.

Method of Use

Figure 8A:
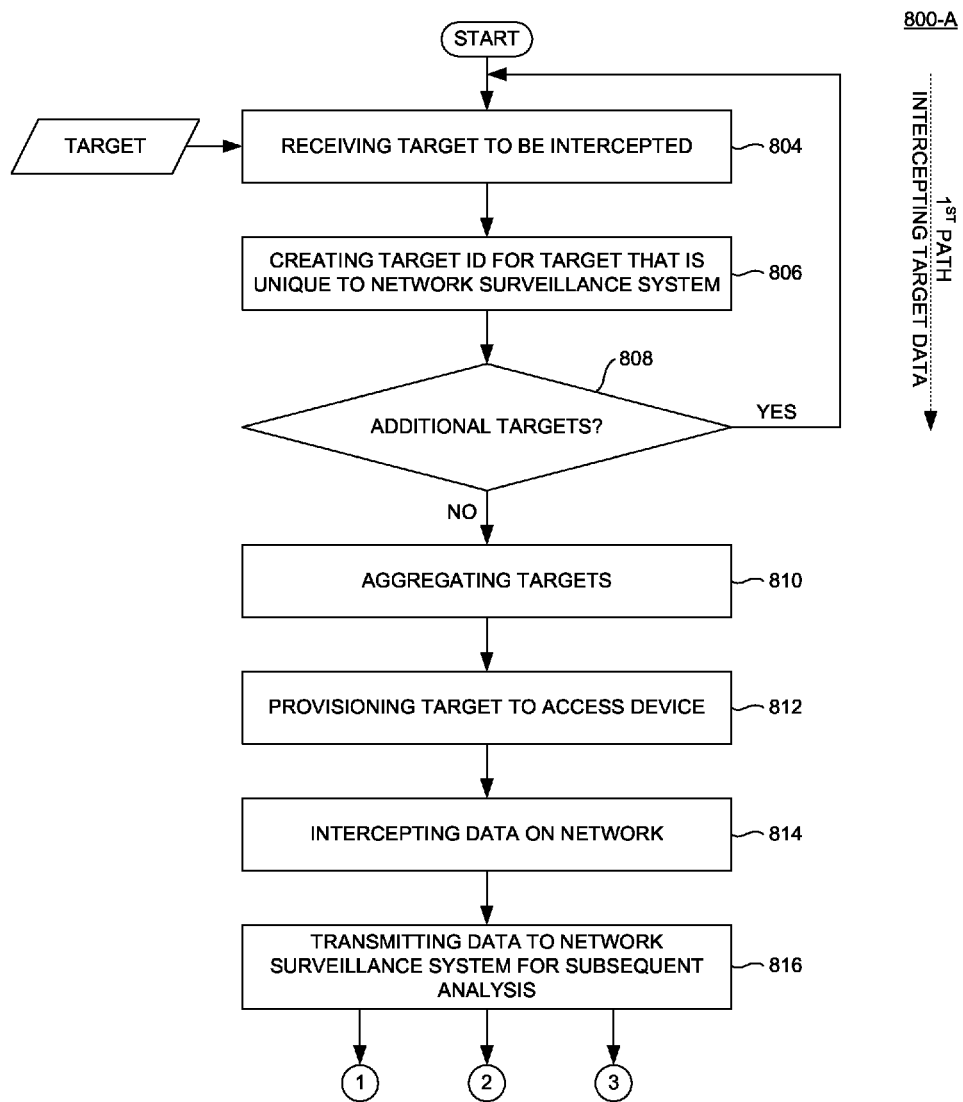
FIG. 8A is a flowchart of a method for monitoring data streams on a network, according to one or more embodiments.
Figure 8B:
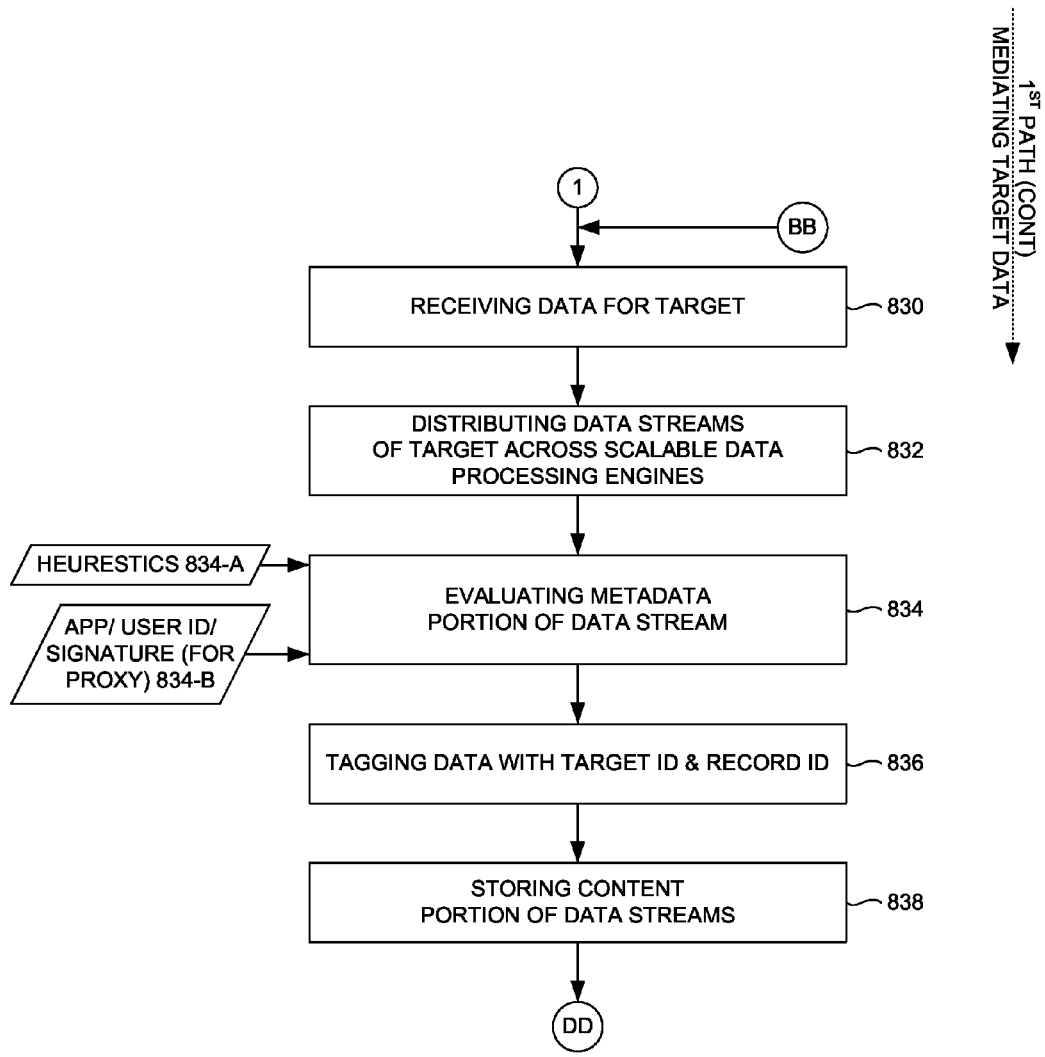
FIG. 8B is a flowchart, continued from FIG. 8A, of a method of mediating the collected target data, according to one or more embodiments.
Figure 8C:
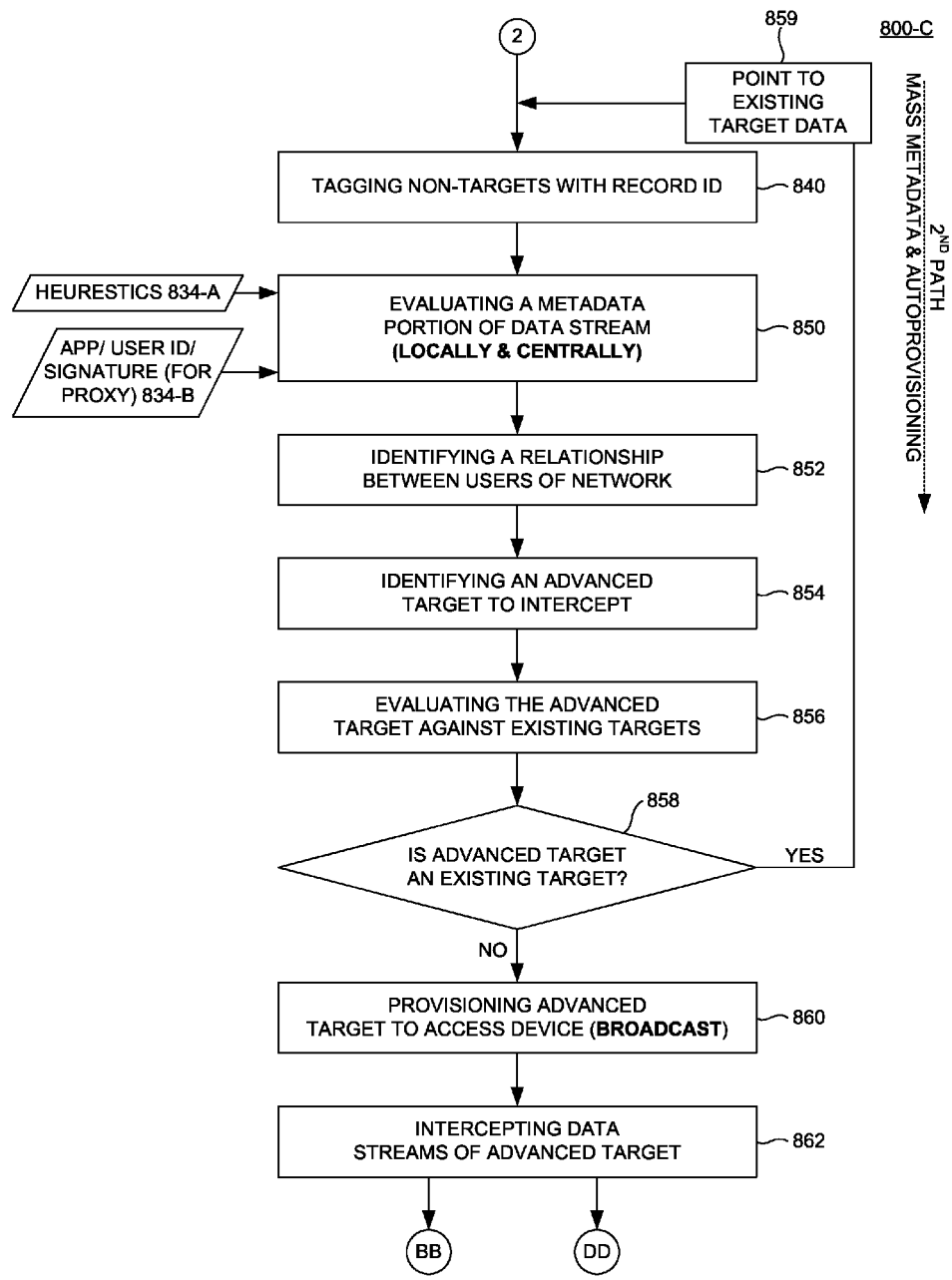
FIG. 8C is a flowchart, continued from FIG. 8A, of a method of mass metadata extraction and analysis, according to one or more embodiments.

FIGS. 8A through 8C provide flowcharts illustrating a method of collecting, managing, and processing data streams from a network for both known users and users not currently of interest, according to one or more embodiments. The flowchart components, e.g., steps, will be described as applied to both apparatus and system components and to case tables provided herein.

Referring now to FIG. 8A, a flowchart 800-A of a method for collecting data streams on a network is shown, according to one or more embodiments. Flowchart 800-A begins with step 804 of receiving at a network monitoring system (NMS), a known user of interest to be monitored on the network. Step 804 is implemented by entering known user information via known user input 204 of FIG. 2 for columns A-M of table 700-A of FIG. 7A for known users belonging to a given analyst in column K, typically segregated for security and confidentiality purposes. Thus, analyst L1 would enter their known user info in columns A-M for "Dewey Doe" of row 701. Similarly, analyst L2 enters their known user info in rows 702 for "John Doe", and 706 for "Tom Doe," while analyst L3 enters known user info in rows 703 for "Chee Doe," row 704 for John Doe, row 705 for "John Doe", and row 710 for "Clyde Jones," and while analyst L4 enters known user info in rows 708 for "John Doe," which is the same known user and known user type, e.g. cell phone, as row 702, but for a different analyst, and other different factors. At some point in the future, analyst L1 would enter the information for row 716 for "Mary Smith," which in this example would only be available at some time in the future. Analysts L1-L4 can enter data according to their own independent timetables, and their independent data input facility. Step 804 includes the creation of a known user ID in known user input 204 for the given known user data entered into the NMS.

Alternatively, if implementing a multi-tenant feature of the present disclosure on the NMS, a given neutral administrator could be tasked with entering all known user information for all analysts using the present disclosure, because after being entered, the NMS via the look up table (LUT) would be able to discriminate which data belonged to which known user of interest belonged to which analyst, and could make that information only available to the given analyst with administrative privileges to see it.

Furthermore, with a multi-network feature of the present disclosure, a given analyst entering information for different systems would not have to enter them on different systems slated for different networks. Instead, a given analyst could enter the known user information on a single NMS system for collecting data streams for known users of interest on different networks. Without the multi-network feature the analyst might have to enter known user info on multiple systems, one for each communication network on which the known user of interest is suspected of communicating. Combined together, multi-tenant and multi-network could provide a single NMS with which a single analyst could enter known user information for multiple analysts collecting data on multiple networks, resulting in substantial reductions in turnaround times, bureaucratic conflicts, operating expense, and other resources.

Step 806 is for creating a known user identification (known user ID) for the known user, wherein the known user ID is unique to the NMS in order to track data streams of the known user of interest during subsequent processing, such as extraction of content and metadata, in the NMS. Step 806 is implemented by the NMS, and specifically the data mediation engine 502 of FIG. 2, by having an accounting system that provides unique known user ID numbers for a given unique known user, e.g., one having unique values for all the variables desired, e.g., some or all of columns A through M of table 700-A, all of which values presented in given rows 101-113 are unique with respect to each other. The NMS accounting system would also time out or delete, known user ID values when a given known user of interest had expired or been expunged by an analyst. The known user ID is unique for a combination of information chosen from a set of data including, but not limited to: the known user, e.g., a known user name, phone number, handle, etc.; a known user type associated with the known user; relational data associated with the known user such as a network provider ID, a data collect time and a data collect date, network ID, etc. A look up table (LUT) or other relational data or database system can be used to track the known user and the data streams of the known user. A single common database/LUT, or a plurality of databases/LUTs, can be used for tracking known users of interest and/or users not currently of interest or new users of interest.

Regarding multi-tenant and multi-network features, the different network values entered in columns K and E, respectively, provide another variable for the row, thus making them unique with respect to each other, and thereby resulting in different known user IDs. For example, similar known user of interest John Doe in Row 702 and 708 has different tenants of analysts L2 and L4 as well as different networks NW2 and NW7, respectively.

Step 808 inquires whether additional users are to be entered, and if so, returns to step 804 to repeat steps of receiving a known user and creating a known user ID, so the known user can be provisioned and collected in a group. Step 808 is implemented in table 700-A by entering information for known users that haven't been entered or are newly available, e.g., for rows 701-710 currently, or for row 716 when it is available in the future. Row 705 can be entered at the time it becomes available.

Step 810 implements optional aggregating of the known users of interest received at the NMS to determine a superset of data streams to be provisioned and collected in order to prevent duplication of effort and data in the NMS, due to the intensive storage requirements of current high data rate communications. Step 810 is implemented by data mediation engine 502 examining via software algorithms and comparing values in memory for all entered known users of interest and seeking any rows that are identical for all appropriate fields. The aggregating step can also provide hierarchical grouping functions per user-defined fields, e.g., primarily grouping known users of interest per the network to which they are listed, secondarily grouping known users by date, etc.

Step 812 involves provisioning a list of known user IDs via a data mediation engine 502 to access device(s), e.g., 302-A1, of FIG. 2 in order to collect data streams used by the known users on one or more networks. The provisioning step can include provisioning multiple access devices for a given network, e.g., 302-A1 and 302-Ap coupled to network NW1 202-1. In particular, step 812 is implemented by communicating known user type information of column D assigned by data mediation engine 502 per algorithms developed to known user given data communication types and links, e.g., phone number, webmail address, etc.

Step 814 implements collecting data on the network. In one embodiment, only known user data is collected on the network, by searching for strings of identifiers in traffic that match identifiers of known user sought, e.g., the known user name, or alias, per column C, or known user type, per column D, and given chronology variables as in columns G, H and J, amongst other potentially important variables, such as the third-person to whom a known user is communicating, e.g., column F. In another embodiment, the entire data stream, including both metadata and content, for all available users of the network, is collected and then segregated into appropriate portions of data depending on an application and level of monitoring desired by the analyst. Other embodiments can be implemented in step 814 to retrieve: portions of data streams, e.g., content and/or metadata; for known users, users not currently of interest portions thereof, or any population of communication network users that NMS defines, e.g., by an ad hoc or an algorithmic rule.

In one embodiment, the entire data signal, e.g., content and metadata, of all available users on the network are communicated to the AMB device for access. The different quantities of collected data are segregated and split off for different levels of processing as described in a subsequent step. The present disclosure is well-suited to monitoring a wide range of signal types and a wide range of one or more collection conditions, seeing as content and metadata can be analyzed to determine compliance with a given monitoring condition.

Step 816 is for transmitting the collected data streams to the NMS for subsequent analysis. Step 816 is implemented differently depending upon what types of data streams are being collected. In one embodiment, parallel data paths, as described in FIG. 1 of a first, second, and third data path, are communicated in parallel to different respective portions of a NMS for processing according to the protocol of the specific data path. In the present embodiment, the metadata and content for all available users of the network is communicated to engines in each of the three data paths, where the data is then reduced as required by the protocol for that data path. Thus, in the present embodiment, the metadata and content for all available users of the network is communicated via: connector "1" to flowchart 800-B of FIG. 8B for processing of first data path; connector "2" to flowchart 800-C of FIG. 8C for processing of second data path, and connector "3" to flowchart 800-D of FIG. 8D for processing of third data path. Thus, the flow paths are: 1) known user of interest mediation of first data path which will strip out and analyze the content portion of data stream for known users of interest, including new users of interest, and pass the first few packets of the data stream containing primarily raw metadata to the metadata mediation of second data path; 2) while similarly the first few data packets of all non-users are sent to the metadata mediation of the second data path in parallel, wherein the metadata is further refined; and 3) while retained data mediation of third data path will accept and record data, e.g., both metadata and content, of desired data streams, e.g., all communication network users.

Referring now to FIG. 8B, flowchart 800-B, continued via connector "1" from FIG. 8A, of a method of mediating the collected data, is shown according to one or more embodiments. Flowchart 800-B embodies the first data path function of the NMS illustrated in FIG. 1 starting with step 830 of receiving the metadata and content for all available users of the network from the access portion of the NMS via connector "C" of FIG. 5, at the load balancer 504. When a data stream containing metadata, content or both are received at the load balancer 504, then it proceeds directly to subsequent distributing step.

Step 832 is for distributing the data streams across a scalable quantity of data processing engines, such as data processing units (DPUs) and data storage units (DSUs), in the NMS. Step 832 is implemented by load balancer 504 distributing, or spraying, data streams across the scalable quantity of DPUs 508-1 to 508-*f* and then to subsequent DSUs 510-1 to 510-*g*, together "data processing engines." The process of distributing or spraying the data streams can be done according to balancing a quantity of data streams themselves, or balancing a quantity of data in the data streams. The present embodiment balances the quantity of data streams across the scalable quantity of data processing engines. A modulo-x algorithm may be used where 'x' is the quantity of branches or parallel data processing engines that are used. Thus, if values 'f' and 'g' equal 4 for the DPUs and DSUs, then a modulo-4 algorithm would be used to deal one out of every four a sequential data streams to each of the multiple DPU and DSU sets. Other techniques for load balancing and traffic management in an even or a biased distribution across the multiple DPUs and DSUs can be implemented in the present disclosure as well.

In step 834, evaluating a metadata portion of the data streams is performed using a scalable quantity of DPUs. This step essentially screens the metadata and content for all available users of the network for known user data. Step 834 is implemented by DPUs examining the metadata portion of the data stream and comparing it to the known user ID criteria of LUT as exemplified in Table 700-A of FIG. 7A. Data streams that do not qualify as known users do not advance to DSU units 510-1 to 510-*g*. Thus, while the metadata and content for all available users of the network may be evenly distributed across multiple DPUs, the resulting known user data streams that pass to the multiple DSUs may not be evenly distributed. A feedback loop to load balancer from multiple DSUs 510-1 to 510-*g* may help to more evenly distribute data streams if a given DSU becomes burdened with a higher than normal traffic rate.

Step 836 implements tagging the data streams of the known user that are collected from the network, with a respective known user ID and optionally a record ID. Thus for example, when a cell phone communication is discovered on a cell network, e.g., via active collection into the mobile traffic switching office (MTSO) or via packetized cell data passed on a network such as the Internet, for known user John Doe, per Row 702 of Table 700-A having a known user ID of "2," and a record ID of "82," then this known user ID and record ID is then embedded, e.g., in the header, in the data stream for future reference during processing in the NMS or collection and analysis by an analyst. Thus data collected for rows 701 through 710 will be tagged with respective known user IDs 1-10, and record IDs 81-90 respectively. Step 836 tagging can be implemented in various alternative embodiments, with either access components performing the tagging, or with mediation engines performing the tagging step. In one embodiment, tagging can occur at the time a data stream is collected, e.g., for known users, or at a later time, such as when retained record is retrieved from a historical file and re-designated as a new user and is now tagged and entered into the NMS for processing and analysis. An example of retained data used for a new user would be when data is stored on the NMS from the analyst that was originally a unknown user but who has now become a new user.

Step 836 can be implemented in different ways depending upon the number of modular features and functions integrated into their NMS. For example, an NMS can be configured to only mediate known user content for the first data path, or to analyze metadata of unknown users and known users for the second data path, or to retain data for some or all of known users and unknown users for the third data path, or any combination of these functions. Thus, in another embodiment, data streams for known users are tagged with a known user ID for analysis of content and tagged with record ID for analysis of metadata and/or for short-term retained data storage, while data streams for unknown users are tagged with a record ID for analysis of metadata and/or for short-term retained data storage in circular buffer. If known users are only mediated for known user content for the first data path and are not analyzed for metadata, and their data is not retained for future use, then only a Known user ID is used and a RID is not needed. Tagging a data stream with a record ID or a known user ID can be implemented by using a wrapper around an existing packet in one embodiment. For retained data function, tagging of known user ID and record ID for retained data stored in storage buffer 350 can be performed by MME server 310 of FIG. 3, or by Metadata extraction engine 408 of FIG. 4 and communicated back to storage buffer 350. For metadata mediation, tagging of record ID for a user not currently of interest, and known user ID for a known user, can also be performed by MME server 310 of FIG. 3, or by Metadata extraction engine 408 of FIG. 4.

Step 836 is implemented by known user mediation engine 520 of FIG. 5 that receives metadata of data streams and evaluates the known user, known user type, and other factors of the data communication that allows the system to identify the data stream uniquely, per the LUT 700-A for example, and then tags the previously assigned known user ID value into the respective data stream for subsequent processing in the NMS, e.g., the DPU 508-1 through 508-*f* and DSU 510-1 through 510-*g*, and subsequent engines.

With step 838, storing a content portion of the data streams is performed in a scalable quantity of data storage units DSUs 510-1 to 510-*g* as shown in FIG. 5. This storing process buffers the data streams before being passed via connection "F" to collection and analysis engine 602 of FIG. 6. Thereafter flowchart 800-B proceeds to connector "DD" which leads to FIG. 8E flowchart 800-E of a method for analysis and collection of data.

Referring now to FIG. 8C, a flowchart 800-C, continued via connector "2" from FIG. 8A, of a method of mass metadata extraction and analysis is shown, according to one or more embodiments. Flowchart 800-C embodies the optional second data path function, illustrated in FIGS. 1 and 2 of processing, e.g., collecting and mediating, the mass metadata of at least one of the data streams, or of all the data streams of known users and users not currently of interest and/or new users of interest on the network. A substantial amount of relational data can be obtained between known users and users not currently of interest, and combinations thereof, via the metadata.

Step 840 implements tagging the data streams of the users not currently of interest that are collected from the network, with a respective record ID (RID) for subsequent metadata mediation. The data as content or metadata from either the known user and/or new users or user not currently of interest are provided from step 814. Thus for example, when a data stream of a new unknown user is identified and the first few packets of the session are sent via MME server 310 to MME and Advanced Targeting 402, then metadata extraction engine 408 can assign a new record ID and tag or wrap the data received from access with the RID. For example, the data collected by access for rows 711 through 713 are users not currently of interest and thus will be tagged with respective record IDs 101-103. RID for both known users and users not currently of interest are any unique code for referencing or correlating, including either a: date/time stamp, a revolving number, or etc.

In step 850 the evaluating of the metadata portion of the data stream of all users of the network is performed, after receiving the metadata and content for all available users of the network from flowchart 800-A via connector "2," at 1 G/10 G Ethernet interface 406 coupled to storage buffer 404 to accommodate bursts of data or variations of data rates between engines. Step 850 is implemented by metadata extraction engine 408 that evaluates the incoming the metadata and content for all available users of the network stream and removes only the metadata portion, e.g., the sender name, receiver name, date and time of transmission, size of communication, attachment file identification, subject line, size of attachment, format or file type of attachment, known user type, protocol of communication, session identification, location, proxy server identification if applicable, and any other logistical information describing the content or the communication link, typically located in a header and/or footer. To locate the metadata, a deep packet inspection per protocol is performed on the data stream. First, the type of communication is identified, e.g., VOIP; Yahoo!™, Gmail™, or Hotmail™ email; chat; video streaming; etc. Then the metadata is retrieved based upon the protocol for that type of communication, which defines the location of the metadata, e.g., a specific bit location in the header of the first or second IP packet for an email. Depending on the protocol, the raw metadata can usually be extracted from the data stream, by line card 332-1 and PIM data card 334, as the first several packets of a session for a given communication network user with the balance of the packets in a data stream being discarded as not needed for metadata meditation. The term "mass metadata extraction" refers to extracting metadata from the entire mass of, e.g., all, users of a communication network. However, step 850 and metadata extraction engine 408 can be applied to any quantity of users of a system, from none to all available users. This analysis of all users can occur in parallel, e.g., on multiple parallel engines; or nearly simultaneously on a single engine.

MME server 310 can be programmed to send to metadata MME and Advanced Targeting 402 only the first several packets of a session that are known to contain the metadata, and not send the subsequent data packets that contain content. Alternatively, metadata mediation engine 402 can be programmed to provide a feedback to MME server 310 when the metadata for a given session has been retrieved and no further packets are necessary for the given session ID. If the data stream is being actively monitored and collected from the network, then that data is currently available. However, if the known user of interest was identified only after a session started, then MME server 310 can request storage buffer 350 to retrieve the retained data for the given known user of interest for delivery to metadata mediation engine 402, assuming the storage buffer is large enough and/or the retained data didn't occur too far in the past to be already overwritten.

Step 852 is for identifying a relationship between at least two of a plurality of data streams from a plurality of network users of a network, e.g., between known users of interest to other known users of interest, known users of interest to users not currently of interest, or between two users not currently of interest and combinations thereof. Sometimes a relationship is not apparent between two or more users of a communication system, whether they are either known users of interest, or users not currently of interest or new users of interest. In this case, a relationship, or link, is created using metrics and other fields of data from both users, along with the evidence that supports the supposition of the relationship, which can optionally be noticed, reviewed and/or approved by an analyst for validity or sufficiency of evidence, e.g., as transmitted from step 852 to collection and analysis methods described in flowchart 800-E. The analyst would have the ability to override the autoprovisioning and thereby withdraw the new user of interest from being monitored on the network and changing the status of the new user of interest back to a user not currently of interest. The increasing separation between two users, e.g., the existence of intermediate users or factors, can be referred to as or degrees of separation (DOS), or degrees of freedom (DOF). A high DOS may make two users of a communication system less likely to have a relationship, but it still may exist, e.g., at different levels of involvement or strategy in a solicitation or conspiracy. For example if a given user passes an email attachment to another user who then passes it to a third and fourth user, then the given user may be sufficiently connected to a fifth user who commits a crime based on a solicitation from the fourth user. If a DOS is sufficient, e.g., meets a threshold of quantity of degrees of separation set by analyst, then the status of the user not currently of interest may be changed to that of a new user of interest, e.g., by assigning a known user ID (TID) to the new user. Step 852 is implemented using mass metadata extraction (MME) output handler 410 which contains algorithms operated on a processor to tabulate metadata and list patterns and degrees of separation between network users, etc. The relationship can be determined from known data, e.g., familial relationships, historical data, etc., or can be constructed by looking for patterns or similarities from a given known user's content or metadata to other users' content and/or metadata, if they are known users of interest or to other users' metadata if they are unknown users. Thus, step 852 may identify a new user as a potential new user of interest based on the relationship of the metadata of the user not currently of interest to any data of the known user of interest. As exemplified in FIG. 7A, the second data path function herein would produce the linking data between John Doe's communications on row 702 and 708 along with the user not currently of interest communications of John Doe on row 711 and 712 and with the user not currently of interest communications of Mrs. J. Doe on row 713, assuming a LEA provided a link between Mrs. J. Doe and John Doe; or assuming metadata analysis provided linking logistical analysis, e.g., origination of communication by John Doe and Mrs. J. Doe from same physical address. The information of which network users contacted which network users, at what chronology information (time, date, duration, etc.), would be available to all analysts. And that information together with the known user information available to LEA L2 and L4 for rows 702 and 708, respectively, a larger comprehensive picture can be established of the known users of interest and other known users of interest and users not currently of interest that might become new users of interest in the future, possibly based on the information gathered herein Step 854 is for identifying a new user of interest to monitor which is implemented in the present embodiment by algorithms based on experience, stochastic processes, and/or other factors, and combinations thereof. That is, step 854 can identify, a user not currently of interest as a potential new user of interest, e.g., create a new user, based on evaluating data, e.g., the relationship of the metadata of the user not currently of interest to any data of the known user of interest, retrieved from the network. A new user of interest may be identified by an advanced algorithm that is capable of identifying the new user of interest automatically by algorithms with or without identification or evaluation by an analyst. That is, autoprovisioning is capable of identifying a new user of interest on the network solely based on the evaluating of the data retrieved from the network. Step 854 is implemented by processor in MME and advanced targeting engine 402, and in particular by MME output handler 410 that implements these algorithms and rules. Thus, in the example provided for step 852, the relationship identified between Mrs. J. Doe communicating to John Doe on row 711, and then the subsequent communication from Mrs. J. Doe to Shady Joe on row 713 might raise the inference that Mrs. J. Doe should become a new user of interest, especially since John Doe is already a known user of interest with respect to communications with Shady Joe per row 708. In another embodiment, the existence of a known user of interest for a given analyst is utilized in step 854 for determining the strength of a case for creating a new user for another analyst, though none of the substantive data collected from a first analyst is directly given to a second analyst who does not have the known user, without the second analyst generating the known user of interest per protocol themselves as prompted after generation per finding new users of interest. While the example provided simply linked communications between network users, much more sophisticated linking can occur using other variables and fields from metadata, e.g., a common subject reference, a meeting location, a same attachment to an email, etc.

Step 858 inquires whether the new user of interest is listed as an existing known user of interest already for purposes of avoiding duplication of effort. In particular, step 858 inquires whether a new user for a second analyst already exists as a known user of interest for a first analyst. Step 858 is implemented by advanced targeting agent engine 414 communicating to MME output handler 410 the results of a search through existing known users in its memory for one that matches a desired new user, sought by MME output handler 410. If the requested new user of interest already exists, then a pointer per step 859 is provided for the second request for the collected data of the known user of interest to point it to the data, or portion of data, that has already been collected for the known user of interest.

If there is no overlap or only a partial overlap between a potential new user of interest against a known user of interest per step 858, then the new user's information can be provisioned to be collected based upon the relationship discovered by the metadata processing unit for the portion of data needed. The provisioning step 860 is implemented by target mediation engine 520, acting as an interface manager, in data mediation engine 502 of FIG. 5 that is coupled via coupling "D" to advanced targeting agent engine 414 of MME and advanced targeting engine 402 of FIG. 4. Subsequently, step 862 collects any available data streams on the network that meet the predetermined criteria via to access device, e.g., 302-A1-302-Ap and 302-z1 of FIG. 2. Thereafter flowchart 800-C proceeds to connector "BB," which leads back to step 830 of FIG. 8B for receiving data for known user, e.g., including new user of interest, and proceeds in parallel via connector "DD" which leads to FIG. 8E flowchart 800-E of a method for analysis and collection of data. Connector BB essentially communicates an ID, e.g., a RID, for the new user to the access device; and monitors the network to collect data, either content or metadata, related to the new user. Thereafter, metadata processing engine can process data from the new user as described herein.

Figure 8D:
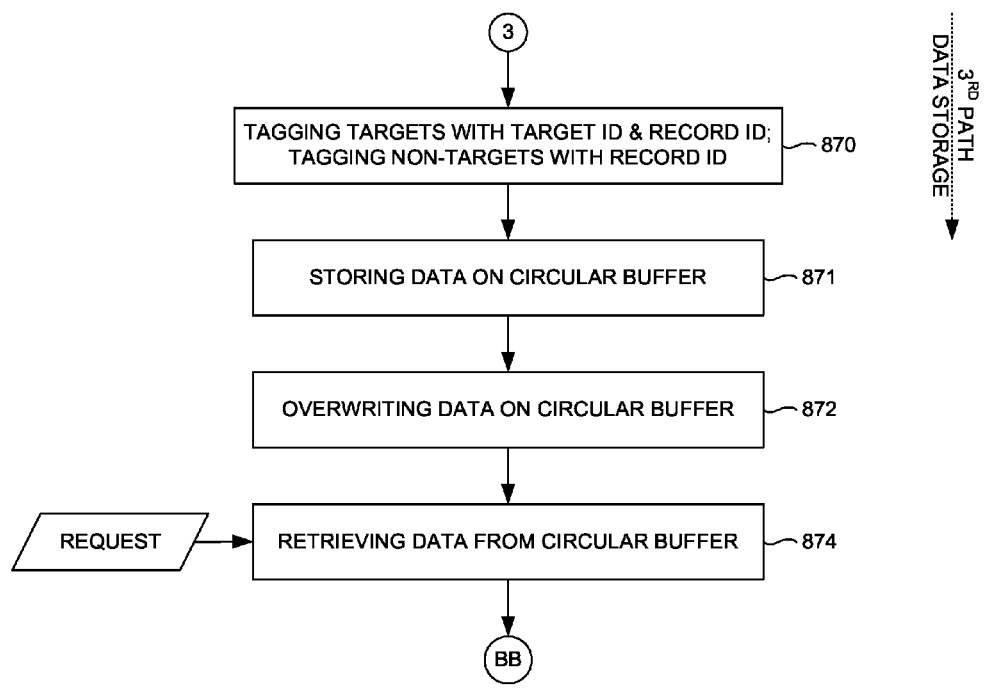
FIG. 8D is a flowchart, continued from FIG. 8A, of a method of storing and retrieving data on a circular buffer, according to one or more embodiments.

Referring now to FIG. 8D, a flowchart 800-D, continued via connector "3" from FIG. 8A, of a method of storing and retrieving data on a circular buffer is shown, according to one or more embodiments. Flowchart 800-D embodies the optional third data path function, illustrated in FIG. 1, of storing collected data on a circular buffer storage and retrieving the retained data on the circular buffer storage at a later time. This method allows the convenience of retrieving data from a circular buffer that stores only a given timeframe of data before being overwritten. A system such as this becomes invaluable when needing to look back in time after the occurrence of a serious security breach to retrieve network communication data that is otherwise not collectable.

Step 870 implements tagging the data streams of known users of interest with a known user ID (TID) and a record ID (RID) and tagging the data streams of users not currently of interest whose data is collected from the network, with only a RID, for subsequent storage as retained data. Thus for example, when data streams of a known user or a user not currently of interest are received in access portion of the NMS, MME server 310 can identify known users of interests, and tag or wrap them with the RID and Known user ID, as well as identify users not currently of interest s and tag or wrap them with the RID (TID is ZERO), then pass them all to storage buffer 350. Step 836 can optionally perform the tagging portion of this step for the known users of interest.

Step 871 is for storing data on a circular storage device, such as a circular, or storage, buffer 350 of FIG. 3, for future access. Storage of data can be performed according to any protocol, whether storing just a portion of, or a full content of, the data streams collected from the network, and whether collecting a portion of the users of the network or all the users of the network. Thus the present method may store both the content and metadata for both known users of interest and users not currently of interest collected from the network, or any other combination desired by an analyst. Step 871 is implemented in FIG. 3 by receiving at a storage buffer 350, the collected data from a network via an access device, e.g., as provided by line cards 332-1 thru 332-t and via 1 G/10 G Ethernet I/F 336. Management of the portion of data stored is provided by control lines, not shown, in FIG. 2 that communicate to the analyst storage preferences to known user input block 204 to AMB, e.g., 302-A1, via data mediation engine 502. As shown in FIG. 7B, column "Y" has a "YES" for every row entry in the present embodiment, thus indicating that every data stream, whether known user or user not currently of interest would be recorded on the circular, or storage, buffer 350. In an optional embodiment, prioritization can be added to given known users and user not currently of interest that have higher likelihood of needing retained data. Thus, in table 700-B of FIG. 7B, rows 702, 708, 711, and 713 have a "YES-1" entry for column "Y" circular buffer, indicating that they have a longer retention time, e.g., overwriting only after a given quantity of cycles, an elapsed time, or a command from an analyst or the NMS system. The record ID and/or known user ID is stored along with the content and/or metadata in the storage buffer 350, so that the stored content and/or metadata may be retrieved at some later point per a request referencing the RID and/or TID.

Step 872 is for overwriting data on the circular buffer, which automatically occurs once the circular buffer capacity has been reached. While the present embodiment utilizes an overwrite protocol that overwrites data continuously on a first-in-first-out (FIFO) basis, the present disclosure is well-suited to a wide range of overwriting algorithms, with optional hierarchical and Pareto sequencing formats for more important data streams, e.g., for suspected but not actual known users. Step 872 is implemented for every AMB device on every network, or on prioritized AMB(s) on prioritized network(s). Thus, a given known user of interest may have fragmented data that is distributed across multiple storage buffers on multiple AMB engines.

Step 874 is for retrieving data from circular buffer 874. A request to retrieve data can be provided by an analyst or by an auto provisioning request. Once received, circular buffer will seek the oldest data for a requested known user or network user. Retained data of either content or metadata can be retrieved from circular buffer via known user ID, record ID, or other global search term. Optionally, circular buffer can be programmed to preserve critical data that would otherwise be overwritten, by selectively skipping over the desired data when overwriting new incoming data, either for either a prescribed or an indefinite time period. Additional circular storage buffers may be coupled to the 1 G/10 G interface so as to preserve the entire record of network communication at the occurrence of a serious security breach. Once requested to be retrieved, retained data can enter into the NMS similar to a real-time collected data stream on the first data path per connector "BB" back to FIG. 8B, e.g., via a 10 G line card 332-t transmitting via PIMS card 334 of FIG. 3 to data mediation block 502 of FIG. 5, where target mediation block would identify the new user of interest from LUT 700-A and tag the data stream for subsequent processing, such as processing per flowchart 800-E of a method for analysis and collection of data. Alternatively, if circular buffer is centrally located, then a single request to a single circular buffer will suffice to retrieve any existing data.

Figure 8E:
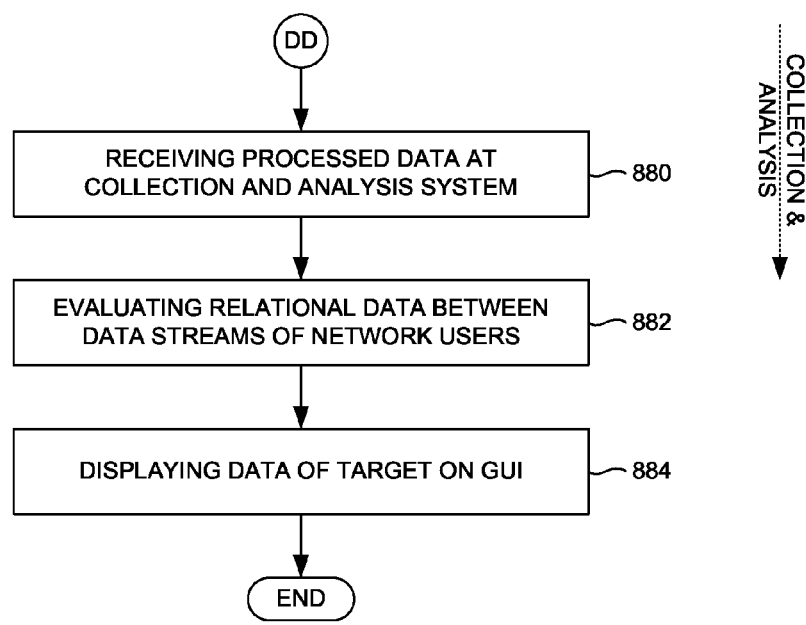
FIG. 8E is a flowchart, continued from FIG. 8B, 8C, or 8D, of a method of collecting and analyzing collected and processed data, according to one or more embodiments.

Referring now to FIG. 8E, a flowchart, continued via connector "DD" from either FIG. 8B, 8C, or 8D of a method of collecting and analyzing collected data is shown, according to one or more embodiments. Step 880 is for receiving processed data at a collection and analysis portion of the NMS. Step 880 is implemented by receiving and buffering on FTP server 604: content and meta data of known users and/or new users of interest from the scalable quantity of data processing engines, e.g., DPUs and DSUs, per FIG. 5 connector "F"; metadata from users not currently of interest, from MME & advanced targeting engine 402 connector "G;" and other relational data and metrics from any combination of first, second, and third data path.

Step 882 is for evaluating relational data between data streams of users at an analysis system for performing analysis, evaluation, feedback, and/or output to user interface. Step 882 is implemented via further processing methods including: link charts; dossier collection of metadata and/or content for a given record ID of a user not currently of interest or for a given known user ID or a given known user of interest comprising multiple known user IDs; social networking program for interactive processing of metadata or content of a given known user or user not currently of interest by an analyst with respect to other known users of interest or users not currently of interest; relational data analysis between multiple network users, whether known users of interest or users not currently of interest, using content and/or metadata; relationship and a degree of freedom, or degree of separation, graphing or tabulation between a plurality of network users, etc. on analysis tools platforms 608-1 to 608-r.

Step 886 is for displaying the data of the known user collected on the network on analysis GUI. Optionally, processed or analyzed data may be displayed on GUI for subsequent interface, feedback and instructions from the analyst. The analysis GUI is operable to receive commands from an analysis user in order to collect additional data, query the system, or add notes or other metadata regarding the known user or user not currently of interest.

Figure 8F:
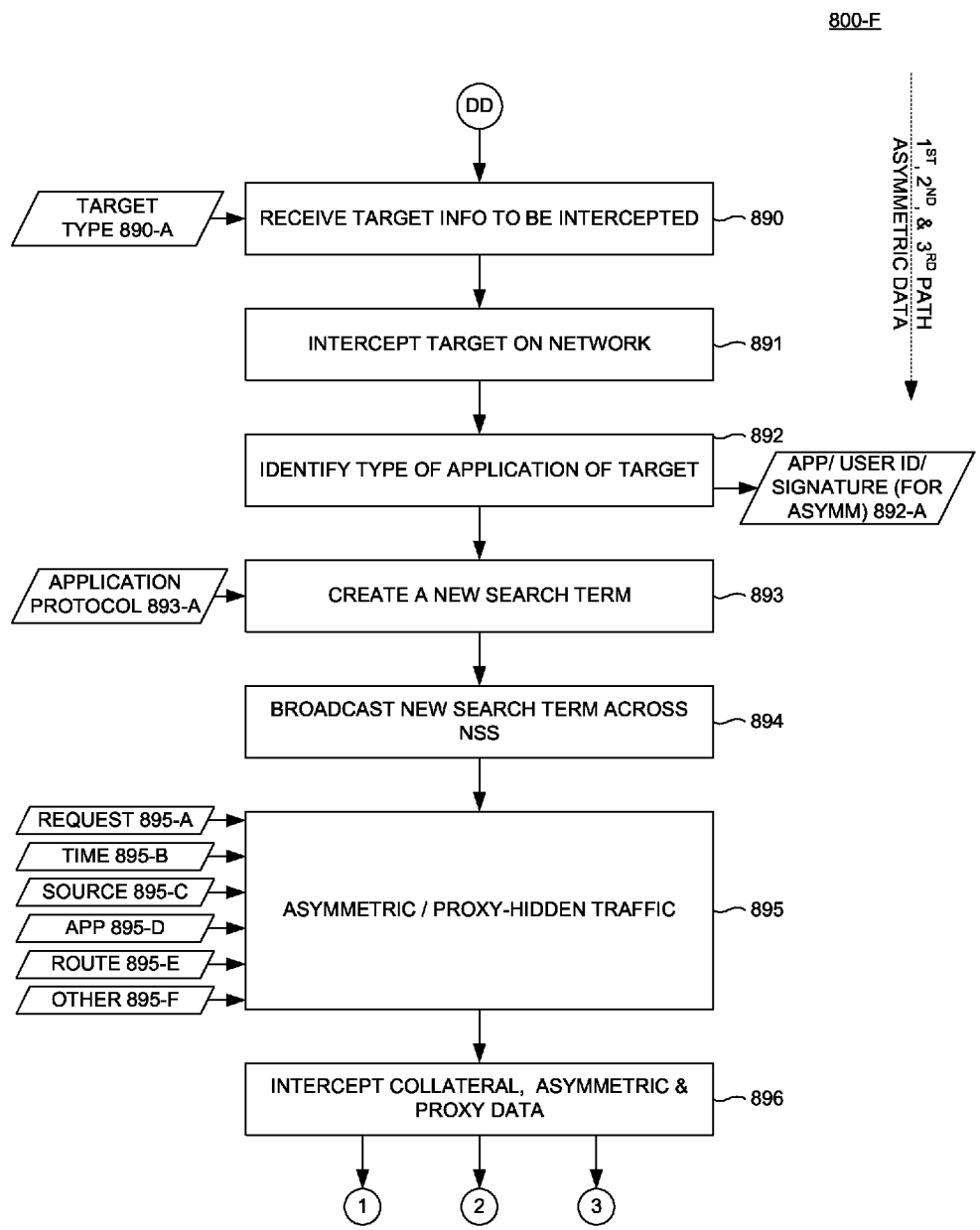
FIG. 8F is a flowchart, continued from FIG. 8B, 8C, or 8D of a method of collecting asymmetric data or data communicated behind a proxy server, according to one or more embodiments.

Referring now to FIG. 8F a flowchart continued from FIG. 8B, 8C, or 8D, of a method of collecting asymmetric data or data communicated behind a proxy server is shown, in accordance with one or more embodiments. Operation 890 receives information about the user of interest to be intercepted, similar to operations 804-812 of FIG. 8A.

Operation 891 monitors the user of interest, e.g., a first data stream of a user of interest, on the network, similar to operations 814-816 of FIG. 8A based on a target type, e.g, a user of interest's email address, a Session Initiation Protocol (SIP) user agent identifier for a phone call communicated over a network, a chat handle, or other user name or identifies used to access applications or communicate information over a network such as the Internet.

Operation 892 identifies the type of application the user of interest is using, e.g., which type of web-based or non-web-based application is being used by the user of interest in the data stream intercepted. A web-based application is one where a software package can be accessed through the web browser, or that use web documents written in a standard format such as hypertext markup language (HTML), XHTML, etc. which are supported by a variety of web browsers. such as web pages, webmail, social media websites, photo sharing websites, audio/video sharing websites, etc. In contrast, a non web-based application is one that does not use the standard format such as HTML, XHTML, etc. but rather uses an application of transmission such as transmission control protocol (TCP) or user datagram protocol (UDP). Exemplary application layers associated with TCP include: BGP, DHCP, DNS, FTP, HTTP, IMAP, IRC, LDAP, MGCP, NNTP, NTP, POP, RIP, RPC, RTP, SIP, SMTP, SNMP, SSH, Telnet, TLS/SSL, XMPP, and others known to those skilled in the art of network communications.

An output from operation 892 is an application/user identification/signature (APP/USER ID/SIGNATURE) that is fed as input 892-A into operation 893 to create a new search term that is specific to, or unique to the collateral or asymmetric data stream associated with the first data stream based on an upper layer of a communication protocol used by the first data stream of the user of interest based on the user's application protocol and/or content and/or the user's handle.

Operation 894 broadcasts the new search term to probes located on other portions of the network where a different routing and/or intermediate server or aggregation points in the network may exist, in addition to the original routing and servers used by the original message. Operation 895 is the collective use of other probes in the network which received the broadcast new search term to evaluate their traffic for different requests 895-A, different time of transmission 895-B, different sources of information 895-C, different applications on the network 895-D, different routes of the data transmission 895-E, and other variables found in the transmission of asymmetric data, or data from behind a proxy server that otherwise hides the user amongst the multitude of collective users behind the proxy server. Operation 896 then collects the collateral, asymmetric and/or proxy data based on the new search term being sought on the multiple probes in the network, and communicates the data to any combination of the first data path, "1", the second data path "2", or the third data path "3" for subsequent processing as described herein.

Multi-Tenant and Multi-network usage of a single NMS is implemented by tracking and controlling access to known users, users not currently of interest and their data via an analyst ID vis-à-vis a known user ID and/or record ID, where the analyst ID specifies the administrative rights and privileges the analyst has on the NMS, e.g., to the known users they entered into the NMS or the known users of interest to which they have authority to access. Thus, the present disclosure allows a single NMS to manage multiple analysts while still maintaining strict security and confidentiality from other analysts. By not requiring a separate system for each analyst, substantial savings in cost and other resources can be realized.

In one or more embodiments, the NMS may receive and assign identification or IDs as analyst IDs and user IDs to users of the system, and users to be monitored. In one or more embodiments, every analyst may sign into the system, and may be assigned an analyst ID. In one or more embodiments, the analysts may be approved to only view a set of data associated with a particular user of interest. In one or more embodiments, the analyst ID may be associated with a set of access privileges. The access privileges may specifically indicate what set of data the analyst may be able to view. In one or more embodiments, a particular analyst may be affiliated to a particular group or agency, and may have access privileges based on that particular agency. In one or more embodiments, the particular analyst may be able to make notes or modifications to the set of data belonging to a particular known user of interest. These changes may only be able to be viewed by other members of the group or agency, in one or more embodiments. For example, an analyst A may belong to a group B. The analyst A may have made many changes and added updates to a set of data associated with a known user of interest U. The analyst A may allow all other analysts belonging to group B to view the changes and updates made by the analyst A. An analyst X belonging to a group other than group B may not be able to view the changes of updates. In one or more embodiments, the NMS may have an approval type of the set of collected data that may differ based on an identity of the analyst. In one or more embodiments, there may be at least two types of approval, including no access and full access. They may also be limited access to the collected data based on the identification of the analyst. In one or more embodiments, the collected data may be parsed into different portions based on an approval type of the analyst.

In one or more embodiments, an other analyst belonging to another group or agency may also be able to view a set of basic information about the known user of interest, but may not be able to view updates or changes made by an analyst of another group. However, the system may allow access to two analysts belonging to different groups the same data by parsing through an instance of the collected data on a storage device where the collected data is stored. However, any changes made to the collected data by both analysts may not be received by each other. In one or more embodiments, the NMS may thus separate access to the same data by maintaining tight regulation of access and update to the set of collected data.

In one or more embodiments, the NMS may store a first metadata associated with a first analysis of the collected data associated with the known user of interest performed by a first analyst in a common storage server. The set of analysis performed by the first analyst may include changes, updates, modifications or any input made to the set of collected data. In one or more embodiments, the NMS may store a second metadata associated with a second analyst of the collected data performed by a second analyst also in the common storage server. However, the first analyst may not be able to view the second analysis and vice versa. The NMS, in one or more embodiments, may be able to simultaneously retrieve a same portion of the collected data associated with the known user of interest for multiple analysts by parsing a single instance of the collected data on a storage device where the collected data is stored.

In one or more embodiments, the system may have a cross-reference detailing the collected data and the identification of the analyst, or analyst ID who is approved to receive the collected data associated with the known user of interest. In one or more embodiments, the known user ID and the analyst ID may be based on at least one of a network ID, a requesting agency ID, a network provider ID, a name of the known user of interest or an associated information of the known user of interest. In one or more embodiments, the NMS may contain a look-up table identifying the analyst, the analyst ID, and access privileges and/or approval type of the analyst, and the set of collected data the analyst may be authorized to receive.

While not illustrated in flowcharts, the methods, apparatus, and system herein can act as a single source to manage known users of interest or users not currently of interest, and their collected data for a plurality of analysts (multi-tenant).

Similarly, the methods, apparatus, and system herein can act as a single source to manage known users of interest and users not currently of interest, and their collected data on a plurality of networks (multi-network). This is accomplished by tracking and controlling access to known users and users not currently of interest and their data via a network ID vis-à-vis a known user ID, where the network ID can specify features such as data link types, individual network protocols, rules, and other requirements. Thus, the present disclosure allows a single NMS to manage multiple independent networks, can be realized while still maintaining strict security and confidentiality and compliance on a network by network basis.

A present embodiment of the disclosure utilizes flowcharts in FIGS. 8A-8E to illustrate functions of collecting, mediating, extracting metadata and analyzing both content and metadata, and storing and retrieving data on a network security system for an analyst seeking information on known users of interest and users not currently of interest exemplified from case tables in FIGS. 7A-7C. However, the present invention is useful for any other type of analyst, e.g., a corporate agent, an educational associate, or any other valid person or entity needing to gather and analyze information of a known user of interest or user not currently of interest on a communication system, seeking any kind of information, metric, or relationship.

For example, educational analysts could be any valid educator or student seeking studies on anonymous populations of users, on contractually consenting users, or other broad-based studies such as demographics. Finally, a valid person or entity needing information could include a private citizen performing a missing person or lost relative search.

Any of the above analysts could use the network security system for analyzing content of communications if authorized or if not regulated. Alternatively, any of the above analysts could use the network security system for analyzing metadata of communications, typically without any regulation issues as metadata is not usually regulated.

While fields and metrics utilized in case tables in FIGS. 7A-7C are for known users and users not currently of interest sought by an analyst the present invention is also applicable to a wide range of fields and metrics to be sought and tracked for known users or users not currently of interest for other analysts as well. Other fields and metrics could apply to many different analysts' needs and applications. For example, logistics of the communication such as time, date, location, attachments and names thereof, names of parties, etc. can apply to many different types of analysis. Other fields may be more applicable to a specific analyst's needs. For example, finance metrics for corporate security or marketing could include: financial transactions, product purchases, investments, psychological profiles, buying profiles, stock market transactions, consumer behavior, financial credit ratings, etc. Similarly, educational metrics e.g., case studies, etc.; personal and social networking, e.g., personal information and relationships, suggested connections, marketing, etc.; or any other application of content, metadata, and/or relationship metrics. The type of data gathered and analyzed is limited only by the existence of the data in the communications. Data can be used by the analyst for any valid temporal purpose whether for historical, contemporaneous, or a predictive future basis, and for any degree of resolution, whether for individuals, or different sizes of populations, and for factual data as well as stochastic variations and studies.

Figure 9:
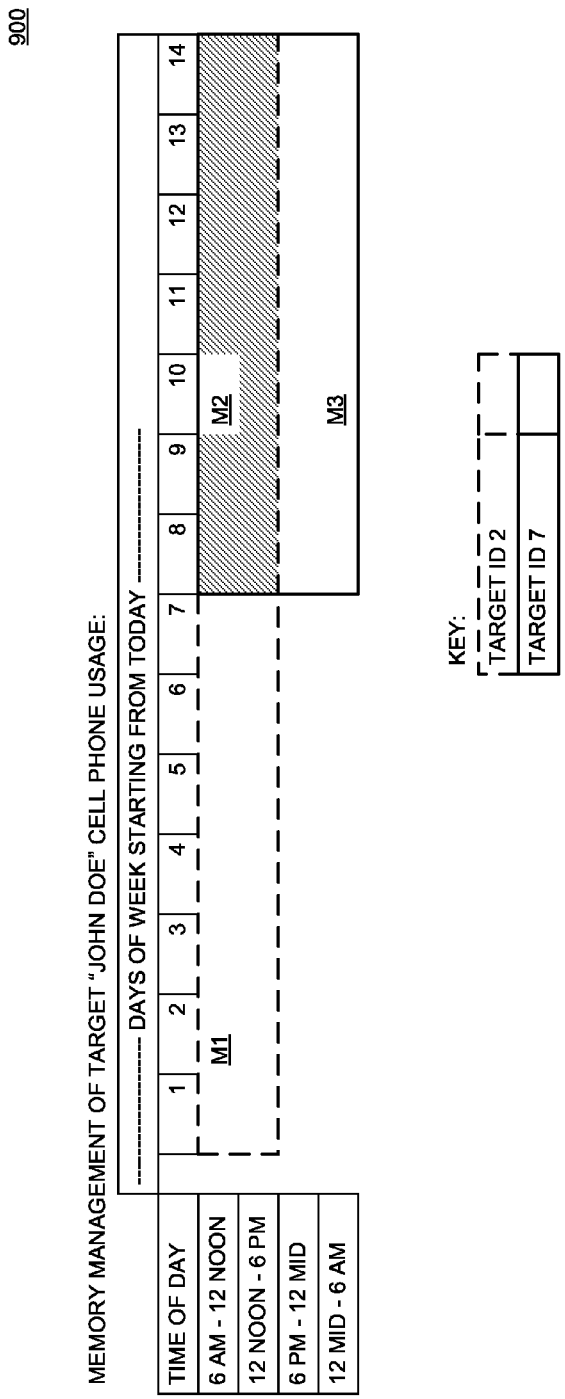
FIG. 9 is an illustration of partitioned memory for storing content, metadata, and analysis information for users of interest and users currently not of interest, according to one or more embodiments.

Referring now to FIG. 9, an illustration of partitioned memory for storing content, metadata, and analysis information for known users and users not currently of interest is shown, according to one or more embodiments. Memory block M1 covers data stored for known user "John Doe" from day 1 to day 7 from 6 am-6 pm, while block M2 covers data stored for known user "John Doe" from day 8 to day 14 from 6 am-6 pm. Block M3 covers data stored for known user "John Doe" from 6 pm-6 am from data 8 to day 14. By have a sufficient resolution in the data, and by segregating the stored data in partitions that consider the allowed days, times, known user types, etc. for a known user of interest, the data can then be stored, and shared among multiple analysts and thereby save memory and cost.

References to methods, systems, and apparatuses disclosed herein that are implementable in any means for achieving various aspects, and may be executed in a form of a machine-readable medium, e.g., computer readable medium, embodying a set of instructions that, when executed by a machine such as a processor in a computer, server, etc. cause the machine to perform any of the operations or functions disclosed herein. Functions or operations may include receiving, creating, aggregating, provisioning, transmitting, tagging, evaluating, distributing, storing, identifying, overwriting, retrieving, displaying, and the like.

The term "machine-readable" medium includes any medium that is capable of storing, encoding, and/or carrying a set of instructions for execution by the computer or machine and that causes the computer or machine to perform any one or more of the methodologies of the various embodiments. The "machine-readable medium" shall accordingly be taken to include, but not limited to, solid-state memories, optical and magnetic media, compact disc and any other storage device that can retain or store the instructions and information, e.g., only non-transitory tangible medium.

Figure 10:
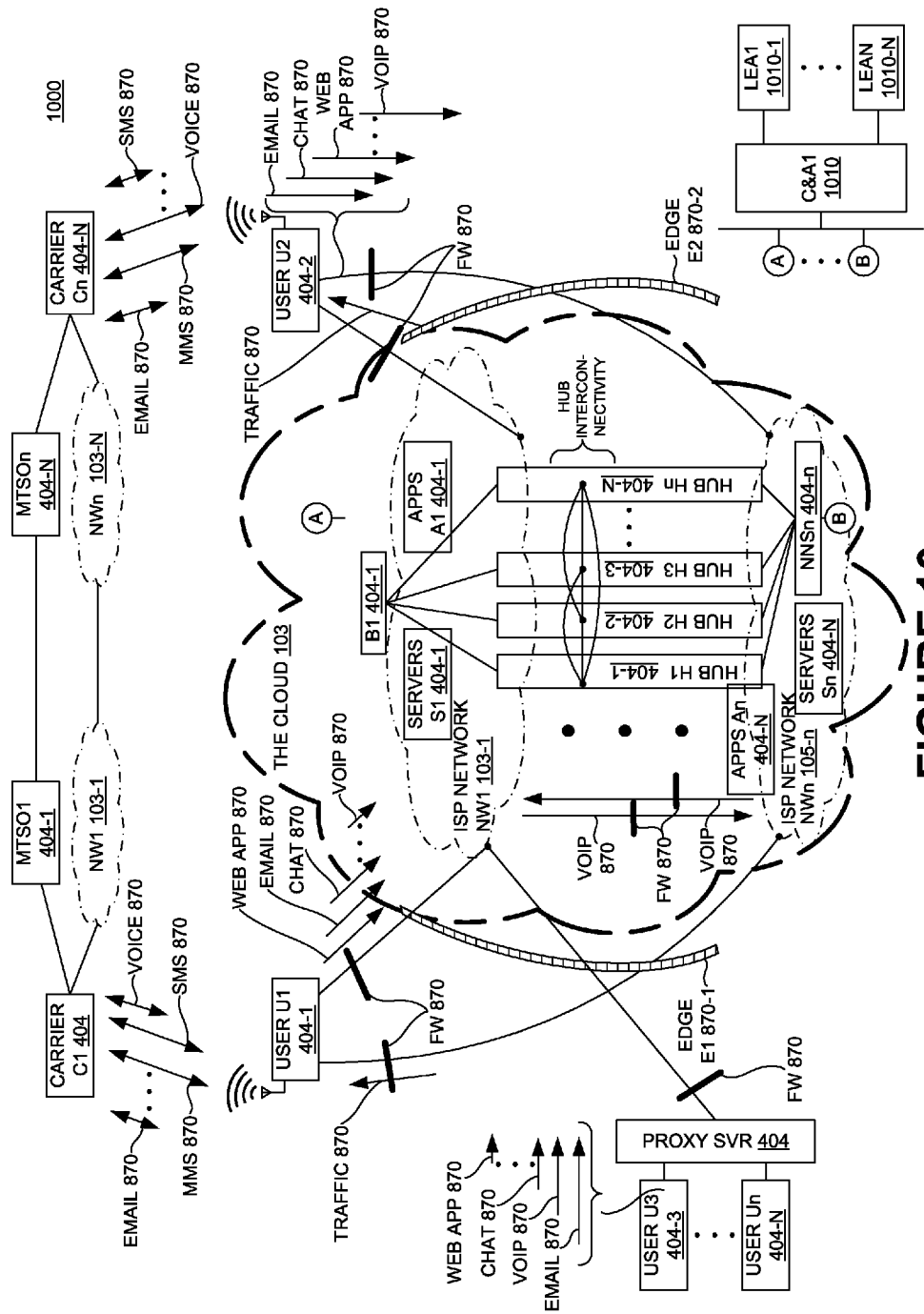
FIG. 10 is an illustration of a network monitoring system involving asymmetric data among multiple service providers, application servers, and users behind proxy server, according to one or more embodiments.

Referring now to FIG. 10, a representation of a computing device is shown, according to one or more embodiments. Exemplary computing device 1000 includes components and functionality that can accommodate the function blocks illustrated in FIG. 1; the system architecture blocks of FIG. 2 through FIG. 6; and the processes of FIG. 8A through 8F, to enable interception, storage, retrieval, and overall management of data from the network, as exemplified in tables of FIG. 7A through 7C. In particular, exemplary computing device 1000 is one embodiment that enables MME server 310 of FIG. 3, Metadata mediation engine 402 of FIG. 4, data mediation engine 502 of FIG. 5, FTP server or any data storage device 604, collection and analysis engine 602 of FIG. 6, and other data computation blocks of the present disclosure. Computing device 1000 can take many forms, each of which are capable of executing instructions to accomplish the functions and operations described herein. For example, computing device 1000 is a personal computer, a mobile device, or a mobile computer to enable some functions, e.g., collection and analysis engine 602 of FIG. 6. In another example, computing device 1000 is implemented as a minicomputer, a mainframe, or a server to enable other functions, e.g., MME server 310 of FIG. 3. Computing device 1000 includes components such as a processor 1002 coupled to a memory 1004, 1005, and/or 1012. In particular, processor 1002 can be a single or multi-processor core, for processing data and instructions. Memory 1004, 1005, and/or 1012 is used for storing and providing information, data, and instructions, including in particular computer usable volatile memory 1004, e.g. random access memory (RAM), and/or computer usable non-volatile memory 1005, e.g. read only memory (ROM), and/or a data storage 1012, e.g., flash memory, or magnetic or optical disk or drive. Computing device 1000 also includes optional inputs, such as alphanumeric input device 1008, such as: a keyboard or touch screen with alphanumeric, function keys, object driven menus; or an optional cursor control device 1010, such as a roller ball, trackball, mouse, etc., for communicating user input information and command selections to processor 1002; or an optional display device 1006 coupled to bus for displaying information; and an optional input/output (I/O) device 1014 for coupling system with external entities, such as a modem for enabling wired or wireless communications between system and an external network such as the Internet, a local area network (LAN), wide area network (WAN), virtual private network (VPN), etc. Coupling medium 1016 of components can be any medium that communicates information, e.g., wired or wireless connections, electrical or optical, parallel or serial bus, etc.

The computing system is only one example of a suitable computing environment and is not intended to suggest any limitation as to the scope of use or functionality of the present technology. Neither should the computing environment be interpreted as having any dependency or requirement relating to any one or combination of components illustrated in the exemplary computing system. The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Exemplary computing systems, such as a personal computer, minicomputer, mainframe, server, etc. that are capable of executing instructions to accomplish any of the functions described herein include components such as a processor, e.g., single or multi-processor core, for processing data and instructions, coupled to memory for storing information, data, and instructions, where the memory can be computer usable volatile memory, e.g. random access memory (RAM), and/or computer usable non-volatile memory, e.g. read only memory (ROM), and/or data storage, e.g., a magnetic or optical disk and disk drive). Computing system also includes optional inputs, such as alphanumeric input device including alphanumeric and function keys, or cursor control device for communicating user input information and command selections to processor, an optional display device coupled to bus for displaying information, an optional input/output (I/O) device for coupling system with external entities, such as a modem for enabling wired or wireless communications between system and an external network such as, but not limited to, the Internet. Coupling of components can be accomplished by any method that communicates information, e.g., wired or wireless connections, electrical or optical, address/data bus or lines, etc.

The present disclosure is applicable to any type of network including the Internet, an intranet, and other networks such as local area network (LAN); home area network (HAN), virtual private network (VPN), campus area network (CAN), metropolitan area network (MAN), wide area network (WAN), backbone network (BN), global area network (GAN), or an interplanetary Internet.

Methods and operations described herein can be in different sequences than the exemplary ones described herein, e.g., in a different order. Thus, one or more additional new operations may be inserted within the existing operations or one or more operations may be abbreviated or eliminated, according to a given application, so long as substantially the same function, way and result is obtained.

Other features of the present embodiments will be apparent from the accompanying drawings and from the detailed description that follows. In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

We claim:

1. A method comprising:
capturing, through a multi-tenant capable Network Monitoring System (NMS) configured to monitor users of a computer network, a data stream solely related to a known user of interest among the users of the computer network, the captured data stream being related to activity of the known user of interest on the computer network;
identifying, through at least one processor of the NMS communicatively coupled to at least one memory, a type of an application being employed by the known user of interest based on analyzing the captured data stream;
generating, through the at least one processor, a new search term unique to an asymmetric data stream of the captured data stream based on an upper layer of a communication protocol used by the captured data stream, an application protocol associated with the identified application, content within the captured data stream and identification of the known user of interest, the asymmetric data stream being related to network communication on part of the known user of interest that is asymmetric in terms of at least one of: a time communicated on the computer network, a source providing data related to the captured data stream onto the computer network, a route chosen on the computer network to send the data related to the captured data stream, an application type and protocol used to package and format the data related to the captured data stream in packets sent on the computer network, data related to web services used by the known user of interest, data related to non-web services used by the known user of interest, data sent through a network different from the computer network but associated therewith, a response to a communication on the computer network on part of the known user of interest, data sent via a route that is different from a route requested on behalf of the known user of interest and proxy data associated with the known user of interest;

broadcasting the new search term to a plurality of probes located in the computer network, each probe of the plurality of probes being associated with a portion of the computer network where at least one of: a different routing and an aggregation point exists compared to an original form thereof; and collecting the asymmetric data stream of the captured data stream based on the broadcasting of the new search term and utilization of the plurality of probes located in the computer network.

2. The method of claim 1, wherein the upper layer of the communication protocol used by the captured data stream is at least one of a layer 2 protocol, a layer 3 protocol, a layer 4 protocol, a layer 5 protocol, a layer 6 protocol, and a layer 7 protocol based on an Open Systems Interconnection (OSI) model.

3. The method of claim 1, wherein the asymmetric data stream is a data stream from one of a requestor and a responder.

4. The method of claim 3, wherein the responder is located behind a proxy server.

5. The method of claim 1, further comprising:
determining a protocol that is specifically applicable to one of a layer 2 protocol, a layer 3 protocol and a layer 4 protocol in combination with at least one of a layer 5 protocol, a layer 6 protocol, and a layer 7 protocol based on the OSI model.

6. The method of claim 1, comprising generating the new search term such that overcollection of the captured data stream is prevented.

7. The method of claim 1, wherein the communication protocol used by the captured data stream is unique to a type of network communication on the part of the known user of interest.

8. The method of claim 1, wherein one of the captured data stream-and the asymmetric data stream thereof is located behind a proxy server with more than one user.

9. The method of claim 1, wherein the application employed by the known user of interest is one of a web and a non-web application.

10. The method of claim 1, comprising performing the identification of the type of application and the creation of the new search term locally to a probe on the computer network.

11. The method of claim 1, further comprising:
communicating the new search term to a centralized mediation engine in the NMS for one of: subsequent evaluation by a user of the NMS and broadcast to the plurality of probes to collect data with the new search term.

12. The method of claim 1, wherein the new search term is an identifier.

13. The method of claim 1, wherein the new search term is a flag identification for an attachment to an email type of application that immediately uploads the attachment to a network server in response to a request from the known user of interest to attach the document to the email.

14. A multi-tenant capable NMS configured to monitor users of a computer network, comprising:
at least one memory; and
at least one processor communicatively coupled to the at least one memory, the at least one processor being configured to execute instructions to:
capture a data stream solely related to a known user of interest among the users of the computer network, the captured data stream being related to activity of the known user of interest on the computer network,
identify a type of an application being employed by the known user of interest based on analyzing the captured data stream,
generate a new search term unique to an asymmetric data stream of the captured data stream based on an upper layer of a communication protocol used by the captured data stream, an application protocol associated with the identified application, content within the captured data stream and identification of the known user of interest, the asymmetric data stream being related to network communication on part of the known user of interest that is asymmetric in terms of at least one of: a time communicated on the computer network, a source providing data related to the captured data stream onto the computer network, a route chosen on the computer network to send the data related to the captured data stream, an application type and protocol used to package and format the data related to the captured data stream in packets sent on the computer network, data related to web services used by the known user of interest, data related to non-web services used by the known user of interest, data sent through a network different from the computer network but associated therewith, a response to a communication on the computer network on part of the known user of interest, data sent via a route that is different from a route requested on behalf of the known user of interest and proxy data associated with the known user of interest, and
broadcast the new search term to a plurality of probes located in the computer network to enable collection of the asymmetric data stream of the captured data stream, each probe of the plurality of probes being associated with a portion of the computer network where at least one of: a different routing and an aggregation point exists compared to an original form thereof.

15. The NMS of claim 14, wherein:
the asymmetric data stream is a data stream from one of a requestor and a responder.

16. The NMS of claim 14, wherein the upper layer of the communication protocol used by the captured data stream is at least one of a layer 5 protocol, a layer 6 protocol, a layer 7 protocol and a combination thereof based on an OSI model.

17. The NMS of claim 14, wherein the communication protocol used by the captured data stream is unique to a type of network communication on the part of the known user of interest.

18. A system comprising:
a computer network; and
a multi-tenant capable NMS configured to monitor users of the computer network, the NMS being configured to:
capture a data stream solely related to a known user of interest among the users of the computer network, the captured data stream being related to activity of the known user of interest on the computer network, identify a type of an application being employed by the known user of interest based on analyzing the captured data stream, generate a new search term unique to an asymmetric data stream of the captured data stream based on an upper layer of a communication protocol used by the captured data stream, an application protocol associated with the identified application, content within the captured data stream and identification of the known user of interest, the asymmetric data stream being related to network communication on part of the known user of interest that is asymmetric in terms of at least one of: a time communicated on the computer network, a source providing data related to the captured data stream onto the computer network, a route chosen on the computer network to send the data related to the captured data stream, an application type and protocol used to package and format the data related to the captured data stream in packets sent on the computer network, data related to web services used by the known user of interest, data related to non-web services used by the known user of interest, data sent through a network different from the computer network but associated therewith, a response to a communication on the computer network on part of the known user of interest, data sent via a route that is different from a route requested on behalf of the known user of interest and proxy data associated with the known user of interest, and broadcast the new search term to a plurality of probes located in the computer network to enable collection of the asymmetric data stream of the captured data stream, each probe of the plurality of probes being associated with a portion of the computer network where at least one of: a different routing and an aggregation point exists compared to an original form thereof.

19. The system of claim 18, wherein the new search term is an identifier.

20. The system of claim 18, wherein:
the new search term is communicated to a centralized mediation engine in the NMS for one of: a subsequent evaluation by a user of the NMS and the broadcast to the plurality of probes.

21. The system of claim 18, wherein:
the asymmetric data stream is a data stream from one of a requestor and a responder.

22. The system of claim 18, wherein the communication protocol used by the captured data stream is unique to a type of network communication on the part of the known user of interest.

23. The system of claim 18, wherein the application employed by the known user of interest is one of a web and a non-web application.

\* \* \* \* \*